(12) United States Patent
Okeya et al.

(10) Patent No.: US 6,424,600 B1
(45) Date of Patent: Jul. 23, 2002

(54) PORTABLE ELECTRONIC DEVICE AND CONTROL METHOD FOR CONTROLLING THE PORTABLE ELECTRONIC DEVICE

(75) Inventors: Makoto Okeya, Nagano-ken; Noriaki Shimura; Joji Kitahara, both of Shiojiri; Hiroyuki Kojima, Matsumoto; Hiroshi Yabe, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/452,852

(22) Filed: Dec. 2, 1999

(30) Foreign Application Priority Data

| Dec. 4, 1998 | (JP) | ............................................. 10-346028 |
| Dec. 15, 1998 | (JP) | ............................................. 10-356763 |
| Oct. 1, 1999 | (JP) | ............................................. 11-281848 |

(51) Int. Cl.$^7$ .............................. G04B 1/00; G04C 3/00; H01H 35/00; G05B 24/02
(52) U.S. Cl. ........................ 368/204; 368/205; 307/116; 323/318
(58) Field of Search ..................... 368/64, 66, 203–205; 307/112, 116–119; 323/318

(56) References Cited

U.S. PATENT DOCUMENTS

| 4,615,625 A | 10/1986 | Moriya |
| 4,702,613 A | 10/1987 | Ohtawa |
| 5,177,714 A | 1/1993 | Ganter et al. |
| 5,457,664 A | 10/1995 | Izukawa et al. |
| 5,881,028 A | * 3/1999 | Higuchi et al. ............. 368/204 |

FOREIGN PATENT DOCUMENTS

| EP | 0 657 793 A1 | 6/1995 |
| EP | 0 836 263 A1 | 4/1998 |
| JP | 52-96570 | 8/1977 |
| JP | 55-158582 | 12/1980 |
| JP | 57-45484 | 3/1982 |
| JP | 60-7381 | 1/1985 |
| JP | 61-202186 | 9/1986 |
| JP | 07074691 | 3/1995 |

* cited by examiner

Primary Examiner—Vit Miska
(74) Attorney, Agent, or Firm—Mark P. Watson

(57) ABSTRACT

To provide a portable electronic device which is easily shifted into a power save mode at the discretion of an operator, such as a user, and optimally reduces power consumption in accordance with the current use of the device. An operator can force an electronic device into a power save mode at the operator's discretion by manipulating a control. Electrical energy stored is thus reliably saved in accordance with the usage by the operator, and unnecessary power consumption is efficiently reduced, even more than in a method in which a device automatically stops the time display and is shifted into a power save mode in accordance with the presence or absence of power generation. Setting a time limit within which the operational state of the control needs to be complete, the operator is prevented from erroneously shifting into the power save mode, and the ease of use of the time measurement device is still assured.

54 Claims, 10 Drawing Sheets

PORTABLE ELECTRONIC DEVICE AND CONTROL METHOD FOR CONTROLLING THE PORTABLE ELECTRONIC DEVICE

BACKGROUND OF THE INVENTION

1. Field of the Invention

The present invention relates to a portable electronic device and a control method for controlling the portable electronic device and, more particularly, to a technique for reducing the power consumption of an electronically controlled timepiece having an analog hand.

2. Description of the Related Art

Small wristwatch-type electronic watches, equipped with a generator such as a solar cell and operable without the need for any battery replacement, have been developed. These electronic timepieces function by initially charging a high-capacitance capacitor with power generated by a generator, and then providing a time display operated from power discharged by the capacitor when no primary power is being generated. For this reason, reliable operation over long periods of time is possible without batteries. Considering the time required to replace a battery and the problem associated with the disposal of a battery, more and more electronic timepieces are expected to be equipped with a generator.

The generator built in the wristwatch may be a solar cell that converts incident light into electrical energy, or a power generating system that converts kinetic energy into electrical energy taking advantage of the motion of a user's arm. These generators are very advantageous in that energy surrounding the user is converted into electrical energy, but the density of usable energy is low, and the availability of energy is not continuous.

The generator cannot continuously generate power, and when no power is generated, the electronic timepiece is operated from power stored in a high-capacitance capacitor. For this reason, the high-capacitance capacitor preferably has a capacitance as large as possible, but the electronic wristwatch cannot house the capacitor if its size is too large. Since it takes time to charge the capacitor, a voltage having an appropriate level is difficult to obtain. On the other hand, with a low-capacitance capacitor, the electronic watch will stop if the duration of non-power generation is lengthened, and even if the electronic watch starts its operation with light coming back on again, the time display suffers from an error with inaccurate current time presented. As a result, the electronic timepiece fails to perform its function as a watch.

Since a wristwatch device employing a solar cell can detect ambient illuminance using a solar cell, the following system has been proposed: when illuminance drops below a set value, for example, during nighttime, the system measures, with its internal counter, the time during which a time displaying stops (in a power save mode), and when luminance gets stronger in the morning, the time displaying is resumed, and the system reverts back to its current time (in a normal operation mode).

However, users often want to check time during nighttime, and the inability to make instant access to the current time inconveniences the users. Occasionally, the wristwatch is not well exposed to light in winter, because people put on overcoats, and the wristwatch stops, failing to perform its expected function. When the wristwatch is not worn and is left in a room, weak light may be incident on the wristwatch, causing it to operate and thereby consuming electric power in vain.

Since when to shift from the normal operation mode to the power save mode is determined by a control unit in the wristwatch rather than at the user's own discretion, the optimum power saving performance matching the usage of the wristwatch by the user is not fully promoted. The shifting into the power save mode is not freely commanded at each of the stages of assembly, inspection and packing in a plant, during the transportation from the plant to retailers, and at a storage stage, and power consumption is not reduced.

OBJECTS OF THE INVENTION

Therefore, it is an object of the present invention to overcome the aforementioned problems.

It is another object of the present invention to provide a portable electronic device and a control method for controlling the portable electronic device, which is easily shifted into the power save mode at the discretion of a particular individual for example, users, manufacturers, retailers, or other people, thereby reducing power consumption to an optimum level in accordance with each individuals use.

SUMMARY OF THE INVENTION

The following summarizes the various embodiments of the present invention. Not all features summarized here are required to achieve all objects of the invention. The present invention includes power generating means or power generator which performs power generation by converting first energy into second energy that is electrical energy, a power source for storing electrical energy resulting from the power generation, driven means or unit driven by the electrical energy supplied by the power source, operation means or unit on which a user performs a variety of operations, operational state determining means or unit for determining whether an operational state of the operation unit is a predetermined operational command state to shift into a power save mode for reducing a power consumption of the driven unit, and operation mode control means or controller for shifting an operation mode into the power save mode in accordance with the determination result provided by the operational state determining unit.

The operation means or unit includes an operation control which the operator operates, and a position detector for detecting a position of the operation control.

The operational state determining unit determines that the operation unit is in an operational command state to shift into the power save mode if the operation control is moved from a first position to a second position and is then moved back to the first position from the second position within a predetermined duration of time.

A carried state detector detects whether the portable electronic device is in a carried state in which an operator is carrying the portable electronic device, wherein, in accordance with the detection result provided by the carried state detector, the operation mode controller shifts the operation mode of the driven unit from a normal operation mode to the power save mode to reduce the power consumption of the driven unit when the electronic device is in a non-carried state.

The carried state detector detects, based on a generation state of the power generator, whether the portable electronic device is in a carried state in which an operator is carrying the portable electronic device.

The first energy is one of kinetic energy, pressure energy and thermal energy.

When the first energy is one of optical energy and electromagnetic energy, and the operation mode controller shifts the operation mode of the driven unit to the power save mode when the portable electronic device is in a non-carried state and when the power generator is in a predetermined generation state corresponding to the power save mode.

The driven unit may be a time display means for presenting a time display.

The operation unit may include a crown which the operator operates, and the position detector detects the position of the crown.

The operational state determining unit determines that the operation unit is in an operational command state to shift into the power save mode if the crown is moved from a first position to a second position and is then moved back to the first position from the second position within a predetermined duration of time.

The time display may include an analog hand for presenting an analog time display, and hand drive unit drives the analog hand, wherein the operation mode controller includes an operation stopper for stopping the operation of the hand drive unit throughout the power save mode.

An elapsed time counter counts elapsed time from the start of the power save mode, when the operational state of the operation unit is changed to an operational command state to shift into the power save mode, and a return to current time display unit returns the display on the time display to the current time, and accounts for the elapsed time in accordance with the count provided by the elapsed time counter, when the power save mode is shifted to the normal operation mode.

A control method of the present invention for controlling a portable electronic device including an operation control on which an operator, such as a user, performs a variety of operations, a power source stores electrical energy, and a driven unit is driven by the electrical energy, includes a power generating step for generating power by converting first energy into second energy that is electrical energy, an operational state determining step for determining whether an operational state of the operation control is a predetermined operational command state to shift into a power save mode for reducing a power consumption of the driven unit, and an operation mode control step for shifting an operation mode into the power save mode in accordance with the determination result provided in the operational state determining step.

The operational state determining step may include a position detecting step for detecting a position of the operation control.

The operational state determining step determines that the operation control is in an operational command state to shift into the power save mode if the operation control is moved from a first position to a second position and is then moved back to the first position from the second position within a predetermined duration of time.

A carried state detecting step detects whether the portable electronic device is in a carried state in which an operator is carrying the portable electronic device, wherein, in accordance with the detection result provided in the carried state detecting step, the operation mode control step shifts the operation mode of the driven means from a normal operation mode to the power save mode to reduce the power consumption of the driven unit when the portable electronic device is in a non-carried state.

A generation state in the power generating step is considered when the carried state detecting step detects whether the portable electronic device is in a carried state in which the operator is carrying the portable electronic device.

The driven unity may be a time display and the operation control may be a crown that the operator operates, and the operation mode determining step may include the position detecting step for detecting a position of the crown.

The operational state determining step determines that the crown is in an operational command state to shift into the power save mode if the crown is moved from a first position to a second position and is then moved back to the first position from the second position within a predetermined duration of time.

The time display may include an analog hand for presenting an analog time display, and a hand driver for driving the analog hand, and the operation mode control step includes an operation stop step for stopping the operation of the hand driver during the power save mode.

An elapsed time counting step counts elapsed time from the start of the power save mode, and when the operational state of the operation unit is changed to an operational command state to shift into the power save mode, the return to current time display step for returning the display on the time display to the current time, accounts for the elapsed time in accordance with the count provided in the elapsed time counting step, when the power save mode is shifted to the normal operation mode.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DETAILED DESCRIPTION

Figure 1:
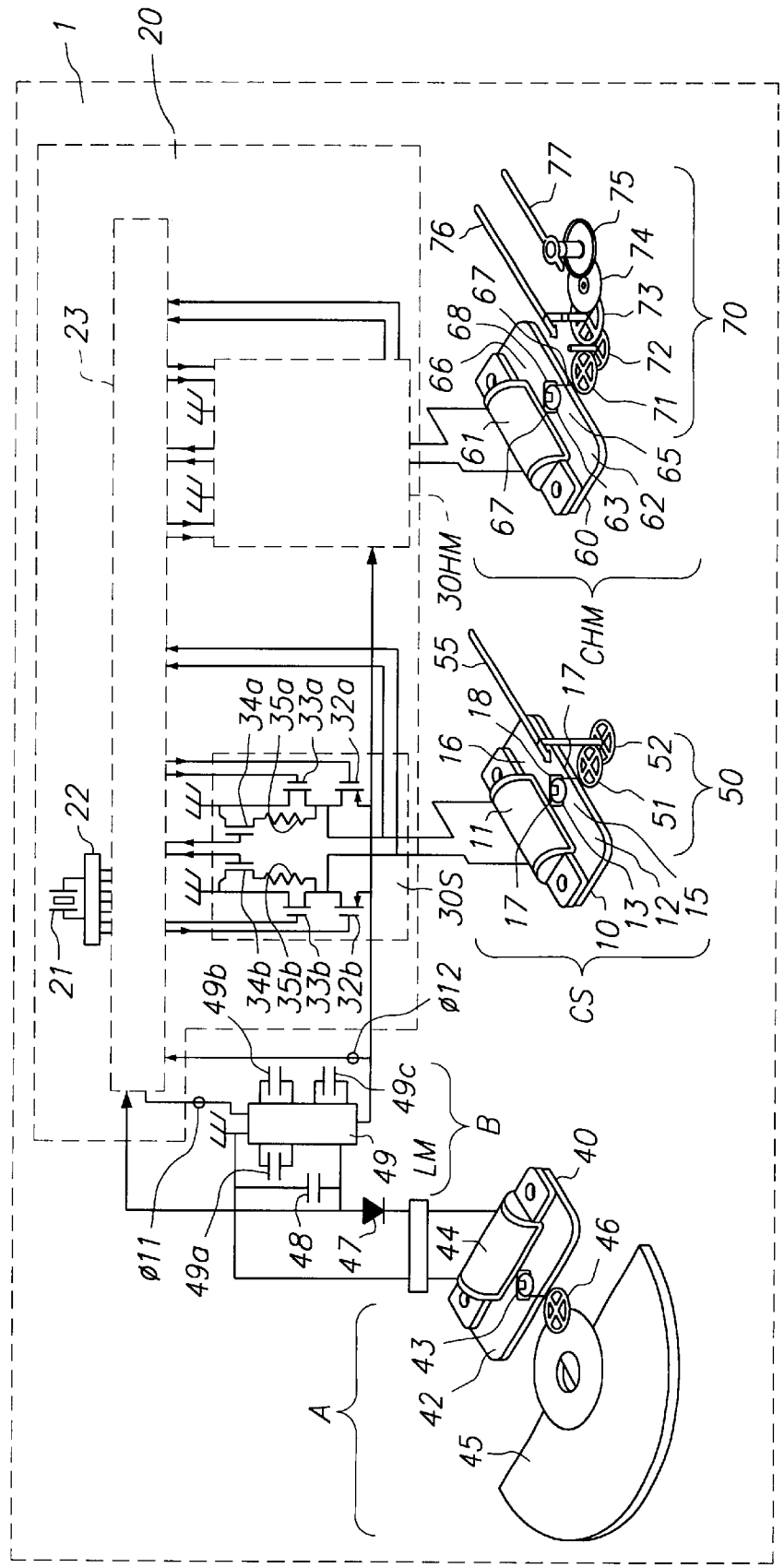
FIG. 1 is a block diagram of a time measurement device of one embodiment of the present invention.
Figure 2:
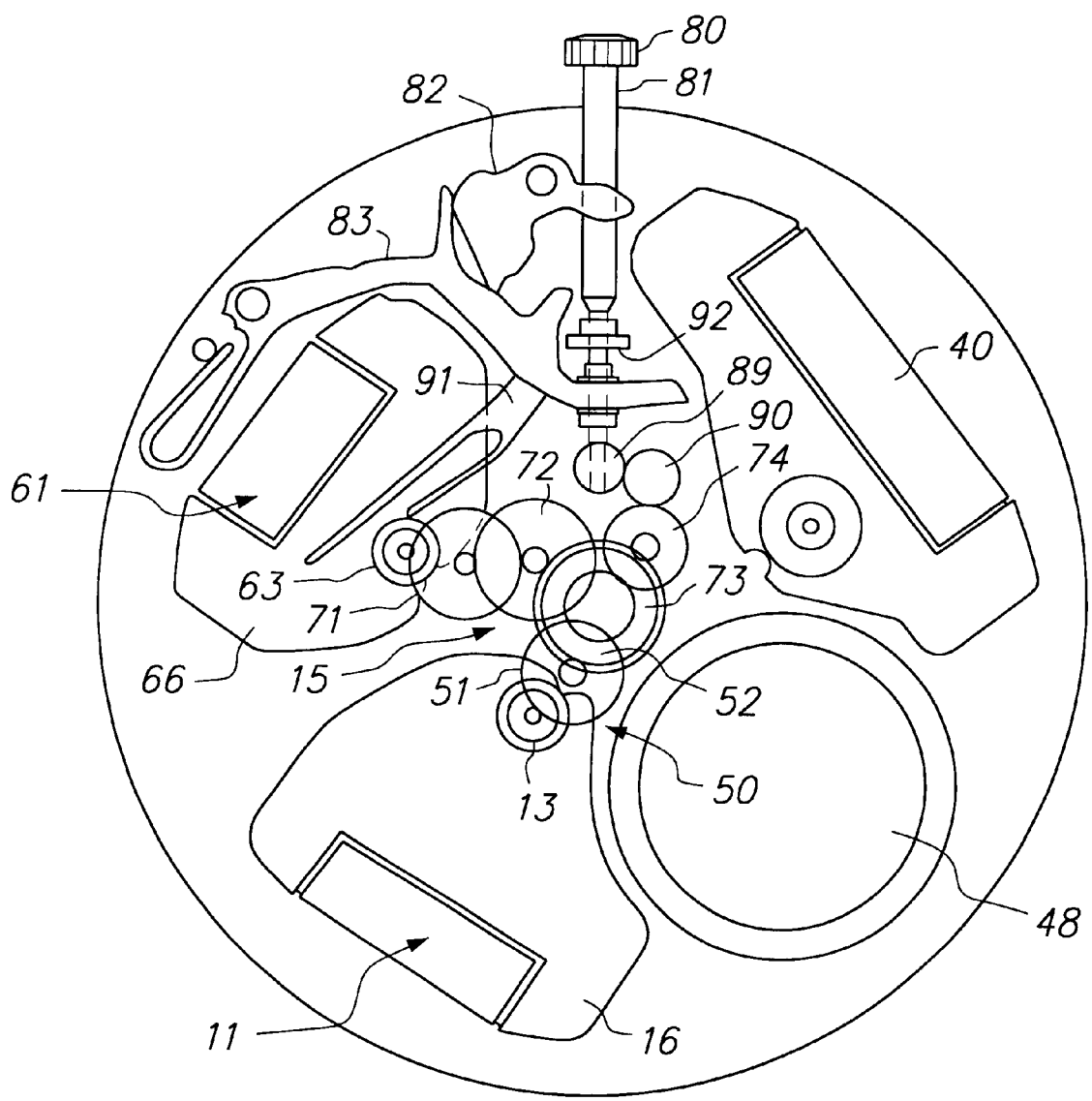
FIG. 2 is an assembly plan view showing a wheel train and its associated components of the time measurement device of the embodiment.

Referring to the drawings, the preferred embodiments of the present invention are discussed hereinafter.
General Construction FIG. 1 shows the general construction of a time measurement device 1 of a first embodiment of the present invention, and FIG. 2 is a plan view of a wheel train assembly and its associated components of the time measurement device 1.

The time measurement device 1 is a wristwatch. To use it, a user wraps a band attached to the body of the wristwatch around his or her wrist. The time measurement device 1 of this embodiment includes, as its major components, a generator section A for generating an alternating current power, and a power source B for rectifying the alternating current power from the generator section A, multiplying the rectified voltage, storing the multiplied voltage, and feeding the power to each functional block in the device. Also included is a controller 23 which, including a generation state detector 91 (FIG. 4) for detecting a generation state of the generator section A, controls the entire device in accordance with the detection result of the generation state detector 91. Further included is a second hand driving mechanism CS for driving a second hand with a stepper motor 10, an hour/minute hand driving mechanism CHM for driving a minute hand and a hour hand with a stepper motor 60, a second hand drive unit 30S for driving the second hand driving mechanism CS in accordance with a control signal from the controller 23, and an hour/minute hand drive unit 30HM for driving the hour/minute hand driving mechanism CHM in accordance with a control signal from the controller 23. In addition, crown 80 (FIG. 2) constitutes an external control unit 100 which inputs commands to shift an operation mode of the time measurement device 1 from a time display mode to a calendar setting mode, or a time setting mode or to force the operation mode into a power save mode, to be described later.

In accordance with the generation state of the generator section A, the controller 23 switches between a display mode (a normal operation mode) that provides a time display by driving the second hand driving mechanism CS and the hour/minute hand driving mechanism CHM, and a power save mode for saving power by stopping the power supplied to the second hand driving mechanism CS and the hour/minute hand driving mechanism CHM. The operator, such as the user, may force the time measurement device 1 to shift from the power save mode to the display mode by physically moving the device, such as by swinging the user's arm with the time measurement device on the user's wrist, which causes power generation to be detected in the device.

Detailed Construction

The detailed construction of the time measurement device 1 is described as follows. The controller 23 will be discussed hereinafter with reference to a functional block diagram.

Generator Section

The generator section A includes a generator 40. Generator 40 is an alternating current generator that generates power in a generator coil 44 connected to the generator stator 42 when a generator rotor 43 rotates within a generator stator 42.

Figure 3:
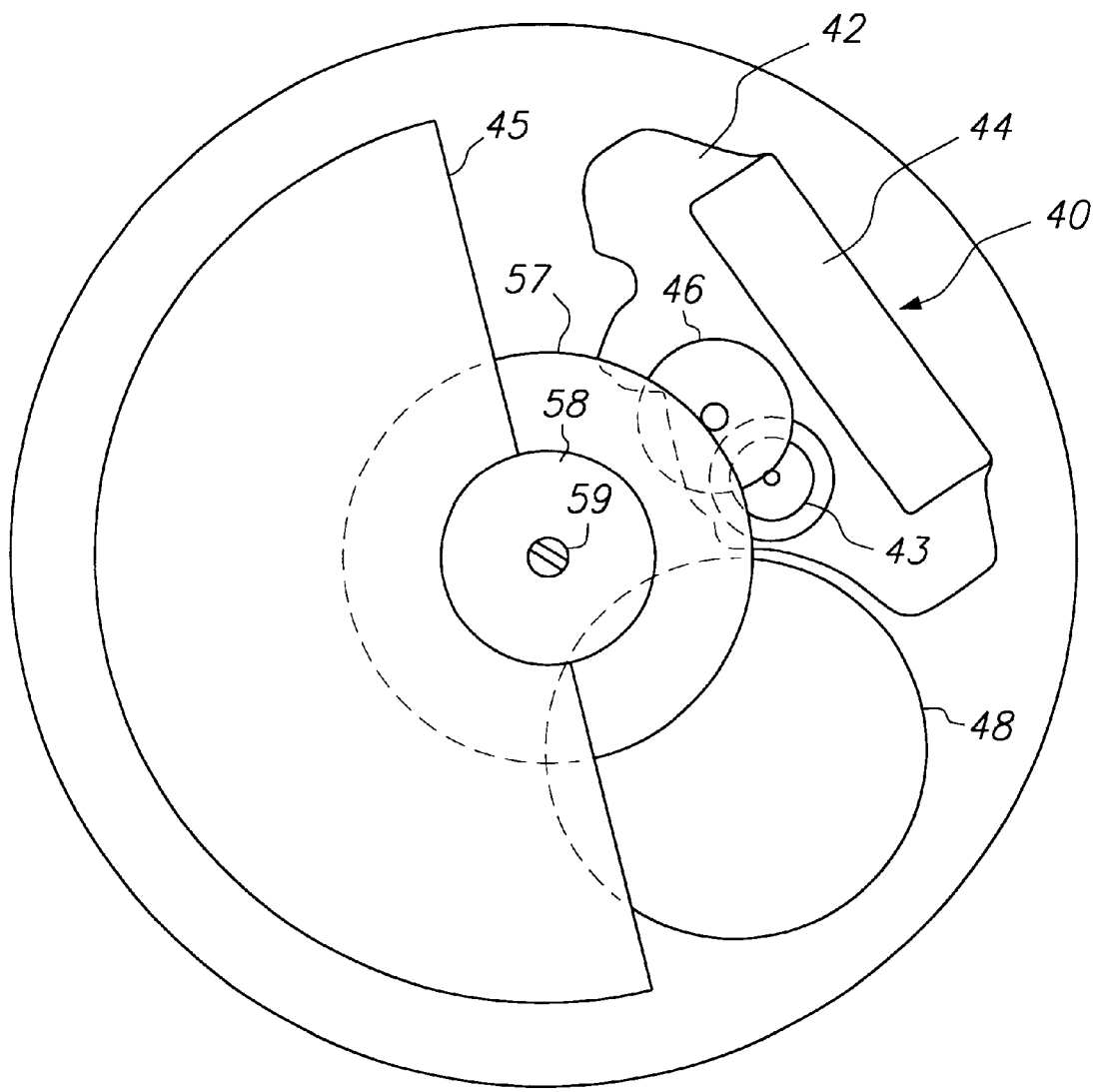
FIG. 3 is an assembly plan view showing a generator section of the time measurement device of the embodiment.

Referring to FIG. 3, the pinion of a generator rotor 43 is in mesh with a rotor driving wheel 46 supported by a main plate, and the rotor driving wheel 46 is in turn in mesh with an oscillating weight wheel 57. In this arrangement, the rotation of the oscillating weight wheel 57 is transferred to the generator rotor 43 at an increased rotation rate.

An oscillating weight 45 is fitted into the oscillating weight wheel 57 to form a unitary structure, and along with the rotation of the oscillating weight 45, the oscillating weight wheel 57 also rotates. The oscillating weight wheel 57 has an inner race 58 on its inner circumference, and the inner race 58 is affixed to an unshown oscillating weight support with a screw 59. A plurality of unshown balls are inserted between the inner race 58 and the oscillating weight wheel 57.

With this arrangement, when the user wearing the time measurement device 1 moves his or her own arm, the oscillating weight 45 picks up the motion, and integrally rotates with the oscillating weight wheel 57. The rotation of the oscillating weight wheel 57 is transferred to the generator rotor 43 via the rotor driving wheel 46. The inner race 58 remains unrotated even when the oscillating weight 45 is rotated, and prevents the screw 59 and the like supporting the oscillating weight 45 from becoming loose.

In this way, the generator 40 generates power by allowing the generator rotor 43 to be rotated at a high speed in response to the motion of the user's arm. The power generated by the generator 40 is stored in a high-capacitance capacitor 48 via a rectifier circuit 47 (see FIG. 1).

Power Source Section

The power source section B includes a limiter circuit LM for preventing excessive voltage from being applied to a later circuit stage, a diode 47 working as the rectifier circuit, the high-capacitance capacitor 48, and a voltage multiplier circuit 49. The limiter circuit LM, the rectifier circuit (diode 47), and the high-capacitance capacitor 48 are arranged in order from the power generator side A as shown in FIG. 1. Alternatively, the rectifier circuit (diode 47), the limiter circuit LM, and the high-capacitance capacitor 48 may be arranged in order from the power generator side A.

The voltage multiplier circuit 49 raises or lowers the voltage in multiple steps using a plurality of capacitors 49a, 49b, and 49c, thereby adjusting the voltage supplied to the second hand drive unit 30S and hour/minute hand drive unit 30HM using a control signal $\phi 11$ from the controller 23. With Vdd (at a high voltage side) set to a reference voltage (GND), the power source section B generates a power source voltage Vss (at a low voltage side).

Hand Driving Mechanism

The hand driving mechanisms CS and CHM are discussed as follows.

Second Hand Driving Mechanism

The second hand driving mechanism CS is first discussed as follows. The stepper motor 10 used in the second hand driving mechanism CS is also called a pulse motor, a stepping motor, step-wise rotating motor, or a digital motor, and is a motor that is driven by a pulse and functions as an actuator for digital control devices. Miniature and light-weight stepper motors find widespread use as an actuator for compact electronic devices or information devices suitable for portable applications. Typical of these electronic devices are time measurement devices, such as an electronic watch, a timing switch and a chronograph.

The stepper motor 10 of this embodiment includes a drive coil 11 that produces a magnetic field in response to a drive pulse supplied thereto by the second hand drive unit 30S, a stator 12 excited by the drive coil 11, and a rotor 13 that rotates within the stator 12 in response to the magnetic field applied.

The stepper motor 10 is of a PM (permanent magnet) rotation type, in which the rotor 13 is constructed of two-pole disklike permanent magnets.

The stator 12 is provided with magnetically saturated sections 17 so that different magnetic poles are generated at phases (poles) 15 and 16 surrounding the rotor 13 in response to the magnetic field generated by the drive coil 11.

To define the direction of the rotation of the rotor 13, an inner notch 18 is formed in the inner circumference of the stator 12 at an appropriate position to generate cogging torque to stop the rotor 13 at a desired position.

The rotary motion of the rotor 13 in the stepping motor 10 is transferred to a second hand 55 via a wheel train 50 which is composed of a second wheel (second indicating wheel) 52 and a second intermediate wheel 51 coupled to the rotor 13 via the rotor pinion, and second hand display is thus provided.

Hour/minute Hand Driving Mechanism

The hour/minute hand driving mechanism CHM is discussed as follows. A stepper motor 60 used in the hour/minute hand driving mechanism has the same construction as the stepper motor 10. The stepper motor 60 includes a drive coil 61 that produces a magnetic field in response to a drive pulse supplied thereto by the hour/minute hand drive unit 30HM, a stator 62 excited by the drive coil 61, and a rotor 63 that rotates within the stator 62 under the influence of the magnetic field.

The stepper motor 60 is of a PM (permanent magnet) rotation type, in which the rotor 63 is constructed of two-pole disklike permanent magnets. The stator 62 is provided with magnetically saturated sections 67 so that different magnetic poles are generated at phases (poles) 65 and 66 surrounding the rotor 63 in response to the magnetic field generated by the drive coil 61. To define the direction of the rotation of the rotor 63, an inner notch 68 is formed in the inner circumference of the stator 62 at an appropriate position to generate cogging torque to stop the rotor 63 at a desired position.

The rotary motion of the rotor 63 in the stepping motor 60 is transferred to a wheel train 70 which is composed of a second wheel and pinion 71 in mesh with the rotor via its pinion, a third wheel and pinion 72, a center wheel (a minute hand mounting wheel) and pinion 73, a minute wheel 74, and an hour wheel (an hour hand mounting wheel) 75. A minute hand 76 is mounted on the center wheel 73, and an hour hand 77 is mounted on the hour wheel 75. Driven by the rotation of the rotor 63, these hands indicate the hour and minute.

The wheel train 70 may be connected to a transmission mechanism (for example, an intermediate hour wheel, an intermediate date wheel, a date indicator driving wheel, and a date indicator for indicating the day) for indicating the year, the month, and the day, i.e. a calendar display, although it is not shown here. In such a case, a calendar corrector wheel train (for example, a first calendar corrector drive wheel, a second calendar corrector drive wheel, a calendar corrector wheel, a date wheel, etc.) may be arranged in the time measurement device 1.

Second Hand Drive Unit and Hour/Minute Hand Drive Unit

The second hand drive unit 30S and the hour/minute hand drive unit 30HM are discussed as follows. Since both the second hand drive unit 30S and the hour/minute hand drive unit 30HM are identical in construction, the second hand drive unit 30S only discussed herein as it is representative of the two units.

The second hand drive unit 30S supplies the stepping motor 10 with various drive pulses under the control of the controller 23. The second hand drive unit 30S includes a bridge circuit composed of a p-channel MOS transistor 33a and an n-channel MOS transistor 32a in a series connection and a p-channel MOS transistor 33a and an n-channel MOS transistor 32b in a series connection.

The second hand drive unit 30S includes p-channel MOS transistors 33a and 33b, rotation detecting resistors 35a and 35b, respectively connected to the p-channel MOS transistors 33a and 33b, and p-channel MOS transistors 34a and 34b respectively supplying chopper pulses to the resistors 35a and 35b. By supplying the gate electrodes of MOS transistors 32a, 32b, 33a, 33b, 34a and 34b with control pulses having different polarities and different pulse widths at respective timings, the drive coil 11 receives drive pulses having different polarities, or detection pulses for generating induced voltage for rotation detection or magnetic field detection of the rotor 13.

Controller

Figure 4:
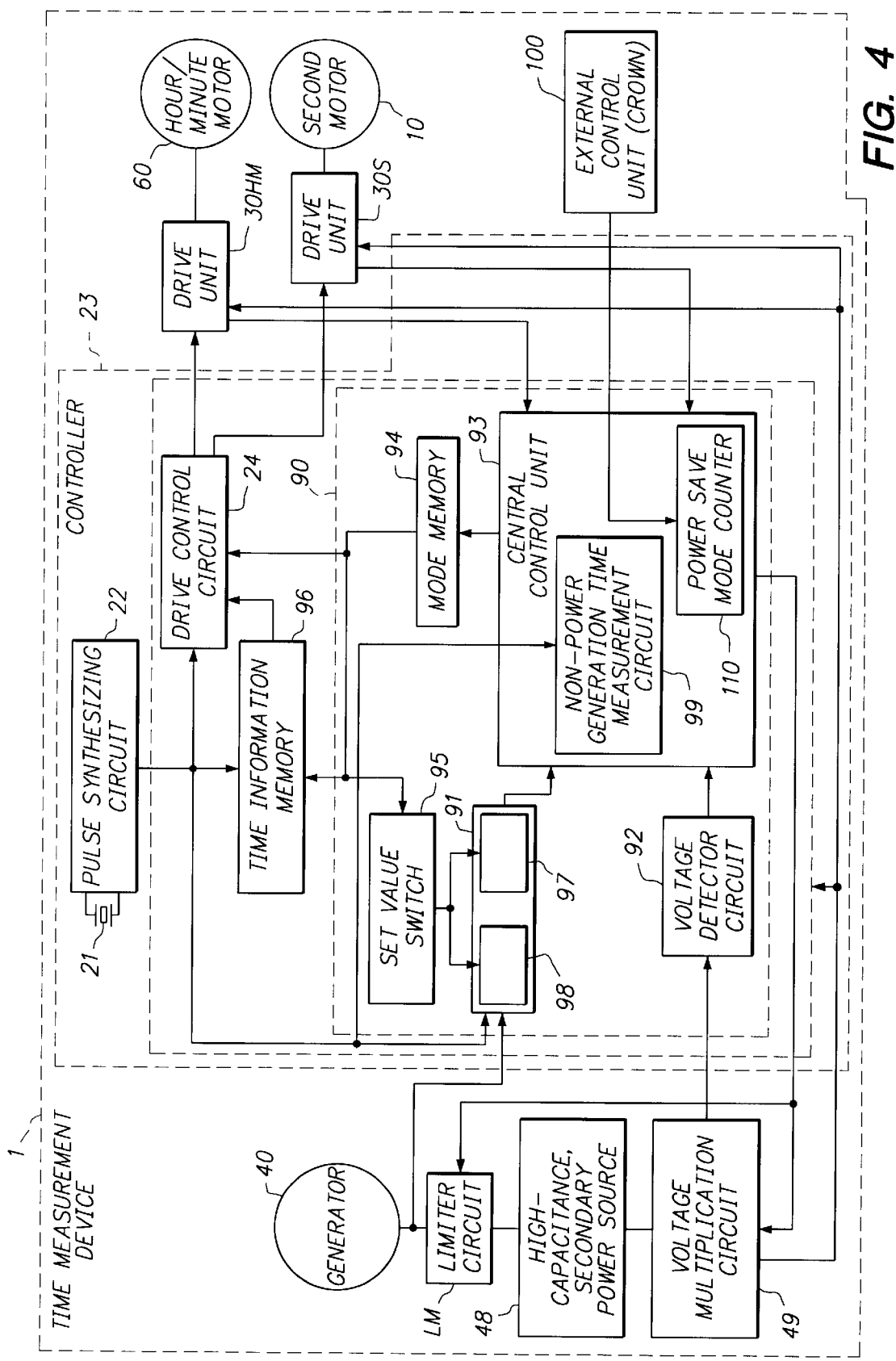
FIG. 4 is a functional block diagram of a controller and its associated components of the embodiment.

The construction of the controller 23 is discussed with reference to FIG. 4. FIG. 4 is a functional block diagram of the controller 23 and its associated functional blocks. The controller 23 includes, as its major blocks, a pulse synthesizing circuit 22, a mode setting circuit 90, a time information memory 96, and a drive control circuit 24.

The pulse synthesizing circuit 22 includes an oscillator circuit that generates a reference pulse having a stable frequency using a reference oscillator element 21, such as a crystal oscillator, and a synthesizing circuit which combines the reference pulse with a pulse that is obtained by frequency-dividing the reference pulse, thereby synthesizing pulse signals having different pulse widths and different timings.

The mode setting circuit 90 includes a generation state detector 91, a set value switch 95 for switching the set value for detecting a generation state, a voltage detector circuit 92 for detecting a charging voltage Vc for a high-capacitance capacitor 48, a central control circuit 93 for controlling the mode of the time display in accordance with the generation state and for controlling a voltage multiplication rate in response to the charging voltage, and a mode memory 94 for storing the mode.

The generation state detector 91 includes a first detector circuit 97 which compares a generated voltage Vgen of the generator 40 with a set voltage value Vo to determine whether power generation is detected, and a second detector circuit 98 which compares a set time value To with a generation running time Tgen. Tgen is a time period during which a generated voltage Vgen is equal to or greater than a low set voltage value Vbas that significantly smaller than the set voltage value Vo. The generation state detector 91 determines that the device is in a power generation state if either the first detector circuit 97 or the second detector circuit 98 detects the power generation. The set voltage values Vo and Vbas are negative voltages with reference to Vdd (=GND), and are voltage differences with respect to Vdd.

Figure 5:
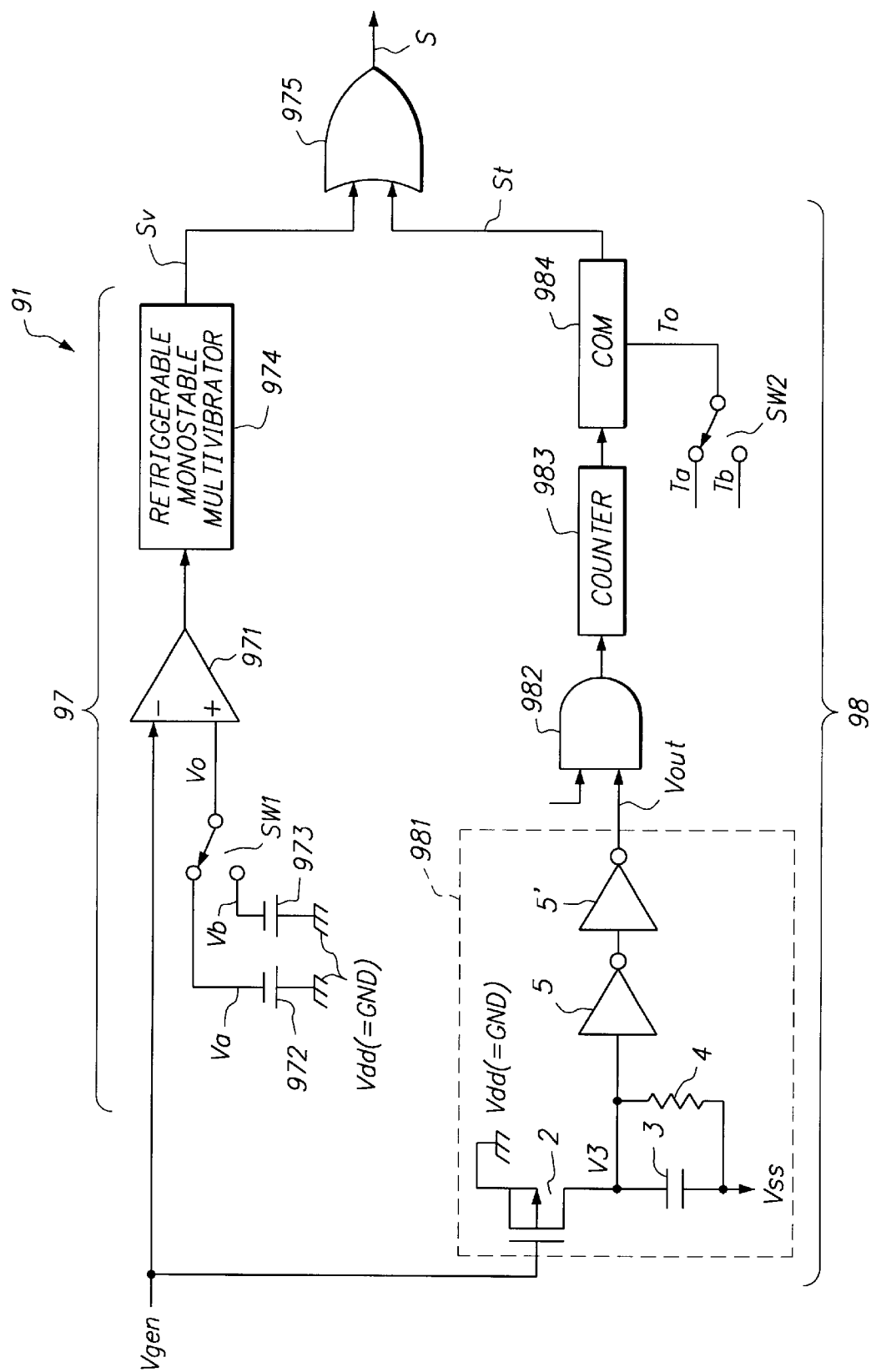
FIG. 5 is a block diagram showing a first detector circuit and a second detector circuit.

The constructions of the first detector circuit 97 and second detector circuit 98 are now described with reference to FIG. 5. As shown in FIG. 5, the first detector circuit 97 is composed of a comparator 971, a reference voltage source 972 for generating a constant voltage Va, a reference voltage source 973 for generating a constant voltage Vb, a switch SW1, and a retriggerable monostable multivibrator 974.

The voltage generated by the reference voltage source 972 is a set voltage value Va in the display mode, while the voltage generated by the reference voltage source 973 is a set voltage value Vb in the power save mode. The reference voltage sources 972 and 973 are selectively connected to a positive input terminal of the comparator 971 via the switch SW1. The switch SW1 is controlled by the set value switch 95, and connects the positive input terminal of the comparator 971 to the reference voltage source 972 in the display mode, or to the reference voltage source 973 in the power save mode. The voltage Vgen generated in the power generator section A is fed to a negative input terminal of the comparator 971. The comparator 971 thus compares the generated voltage Vgen with the set voltage value Va or the set voltage value Vb, and outputs an "H" level comparison result signal when the generated voltage Vgen is lower than one of these voltage values (namely, has a greater amplitude), and outputs an "L" level comparison result signal when the generated voltage Vgen is higher than one of these voltage values (namely, has a lesser amplitude).

Triggered at the rising edge of the comparison result signal transitioned from an "L" level to an "H" level, the retriggerable monostable multivibrator 974 rises from an "L" level to an "H" level, and generates a signal that rises from an "L" level to an "H" level a predetermined duration of time later than the input signal transition. When the retriggerable monostable multivibrator 974 is triggered again before the predetermined duration of time has elapsed, a measurement time is reset to a new start time measurement.

The operation of the first detector circuit 97 is discussed as follows. Assuming that the current mode is now the display mode, the switch SW 1 selects the reference voltage source 972, and the set voltage value Va is fed to the comparator 971. The comparator 971 compares the set voltage value Va and the generated voltage Vgen and outputs the comparison result signal. In this case, the retriggerable monostable multivibrator 974 rises from an "L" level to an "H" level in synchronization with the rising edge of the comparison result signal.

Alternatively, when the current mode is the power save mode, the switch SW1 selects the reference voltage source 973 and the set voltage value Vb is fed to the comparator 971. Since the generated voltage Vgen does not exceed the set voltage value Vb in this case, no trigger is input to the retriggerable monostable multivibrator 974. A voltage detection signal Sv remains low.

In this way, the first detector circuit 97 generates the voltage detection signal Sv by comparing the generated voltage Vgen with the set voltage value Va or Vb, depending on the mode.

Referring still to FIG. 5, the second detector circuit 98 is composed of an integrating circuit 981, a gate 982, a counter 983, a digital comparator 984, and a switch SW2.

The integrating circuit 981 is composed of a MOS transistor 2, a capacitor 3, a pull-up resistor 4, an inverter 5, and an inverter 5'.

The generated voltage Vgen is coupled to the gate of the MOS transistor 2, and in response to the generated voltage Vgen, the MOS transistor 2 repeats on/off actions, controlling the charging of the capacitor 3. If the switching element is constructed of MOS transistors, the integrating circuit 981 is manufactured of a low-cost CMOS-ICs including the inverter 5. Alternatively, the switching element and voltage detection element may be manufactured of bi-polar transistors. The pull-up resistor 4 pulls up the voltage V3 of the capacitor 3 to the potential Vss during a non-power generation period, and has a function of creating a leakage current during the non-power generation period. The pull-up resistor 4 has a high resistance value ranging from several tens of MΩ to several hundreds of MΩ, and may be constructed of a MOS transistor having a large on resistance. The inverter 5, connected to the capacitor 3, detects the voltage value V3 of the capacitor 3, and the detection signal Vout is output by inverting the output of the inverter 5. The threshold value of the inverter 5 is designed to be the set voltage value Vbas substantially smaller than the set voltage value Vo used in the first detector circuit 97.

The gate 982 is supplied with the reference signal from the pulse synthesizing circuit 22 and the detection signal Vout. The counter 983 therefore counts the reference signal while the detection signal Vout remains high. The resulting count is input to one input of the digital comparator 984. The other input of the digital comparator 984 is supplied with the set time value To corresponding to set time. When the current mode is the display mode, the digital comparator 984 is supplied with a set time value Ta via the switch SW2, and when the current mode is the power save mode, the digital comparator 984 is supplied with a set time Tb via the switch SW2. The switch SW2 is controlled by the set value switch 95.

The digital comparator 984 outputs its comparison result as a generation running time detection signal St in synchronization with the falling edge of the detection signal Vout. The generation running time detection signal St is at an "H" level when the set time is exceeded, and is at an "L" level when the set time is not exceeded.

The operation of the second detector circuit 98 is discussed as follows. When the power generator section A starts generating an alternating current, the generator 40 outputs the generated voltage Vgen through the diode 47.

When the value of the generated voltage Vgen at the start of generation falls down to Vss from Vdd, the MOS transistor 2 is turned on, which starts charging the capacitor 3. The potential of the capacitor 3 is fixed to Vss through the pull-up resistor 4 during the non-power generation period, but when charging of the capacitor 3 starts at the start of power generation, the potential V3 starts rising up to Vdd. When the MOS transistor 2 is turned off with the generated voltage Vgen increasing to Vss, the charging of the capacitor 3 stops, but the voltage V3 is maintained by the capacitor 3. The above process is repeated as long as the power generation continues. The voltage V3 rises to Vdd, and is stabilized there. When the voltage V3 rises above the threshold value of the inverter 5, the detection signal Vout, namely, the output of the inverter 5' is transitioned from an "L" level to an "H" level, and power generation is thus detected. A desired response time until the power generation detection may be set by connecting a current limiting resistor, by changing the performance of the MOS transistor to adjust the charging current to the capacitor 3, or by changing the capacitance of the capacitor 3.

When the power generation stops, the generated voltage Vgen reliably remains at the level of Vdd and the MOS transistor 2 remains turned off. Although the voltage V3 is maintained by the capacitor 3 for some time, V3 gradually falls from Vdd to Vss because the pull-up resistor 4 drains the charge at the capacitor 3 by means of a small leakage current therethrough. When the voltage V3 falls below the threshold value of the inverter 5, the detection signal Vout, namely, the output of the inverter 5' is transitioned from an "H" level to an "L" level, and a no-power generation state is thus detected. The response time to this detection may be adjusted by varying the resistance of the pull-up resistor 4 or by adjusting the leakage current of the capacitor 3.

When the detection signal Vout is gated with the reference signal by the gate 982, the gated reference signal is counted by the counter 983. The count is compared with the value corresponding to the set time at a time T1 by the digital comparator 984. When a high-level period Tx of the detection signal Vout is longer than the set time value To, the generation running time detection signal St is transitioned from an "L" level to an "H" level.

Discussed next is the magnitude of change in the generated voltage Vgen and the detection signal Vout in response to the generated voltage Vgen change as a function of a difference in the rotational speed of the generator rotor 43.

The voltage level and period (frequency) of the generated voltage Vgen change depending on the rotational speed of the generator rotor 43. Specifically, the higher the rotational speed, the greater the generated voltage Vgen becomes in amplitude, and the shorter the period becomes. For this reason, the length of the output active period (generation running time) of the detection signal Vout changes depending on the rotational speed of the generator rotor 43, i.e., the level of the power generated by the generator 40. In other words, when the rotational speed of the generator rotor 43 is low, i.e., when the strength of generated power is weak, the output active time is ta, and when the rotational speed of the generator rotor 43 is high, i.e., when the strength of generated power is strong, the output active time is tb. The output active times are related as ta<tb. In this way, the strength of power generated by the generator 40 is determined from the length of the output active time of the detection signal Vout.

The set voltage value Vo and the set time value To are switched under the control of the set value switch 95. When the display mode is shifted to the power save mode, the set value switch 95 changes set values Vo and To in the first and second detector circuits 97 and 98 in the generation state detector 91. In this embodiment, set values Va and Ta in the display mode are lower than set values Vb and Tb in the power save mode. Therefore, a higher power level is required to switch to the display mode from the power save mode. The level of power, which may be generated by the ordinary level of motion that the user provides to the time measurement device 1 while normally carrying it, is not sufficient. The user may need to intentionally swing his or her arm to force the charging action. In other words, the set values Vb and Tb for the power save mode are set so that forcible charging attributed to the user's arm swinging is detected. The central control circuit 93 includes a non-power generation time measurement circuit 99 which measures a non-power generation time Tn that cannot be measured by the first and second detector circuits 97 and 98. The central control circuit 93 shifts the operation mode from the display mode to the power save mode when the non-power generation time Tn exceeds a predetermined set time.

Alternatively, the mode is shifted from the power save mode back to the display mode when the following conditions are satisfied: the generation state detector 91 detects that the power generator section A is in the power generation state and the charging voltage VC at the high-capacitance capacitor 48 is high enough to support the display mode.

Since the power source section B in this embodiment includes the voltage multiplier circuit 49, hand driving mechanisms CS and CHM are driven by the voltage multiplier circuit 49 that raises the power source voltage even when a charging voltage VC is low.

The central control circuit 93 determines a voltage multiplication rate in accordance with the charging voltage VC, thereby controlling the voltage multiplier circuit 49.

If the charging voltage VC is too low, a power source voltage high enough to drive the hand driving mechanisms CS and CHM is not achieved even when the charging voltage VC is multiplied. When the power save mode is shifted to the display mode in such a case, an incorrect time display is presented, and power is consumed for no useful purpose.

In this embodiment, the charging voltage VC is compared with a set voltage value Vc to determine whether the charging voltage VC is high enough, and an affirmative answer in this determination is regarded as one condition for allowing a shift from the power save mode to the display mode.

The central control circuit 93 includes a power save mode counter 101 for monitoring whether a command to shift to a predetermined forced power save mode is issued within a predetermined duration of time, when an external control unit 100 is operated by an operator, such as a user of the time measurement device 1.

The mode set in this way is stored in the mode memory 94, and the information about the mode is fed to the drive control circuit 24, the time information memory 96, and the set value switch 95. When the display mode is shifted to the power save mode, the drive control circuit 24 stops supplying the pulse signals to the driving mechanisms, thereby stopping the operation of the second hand drive unit 30S and the hour/minute hand drive unit 30HM. The stepper motor 10 comes to a halt and the time display stops.

Specifically, the time information memory 96 is constructed of an up-down counter (not shown), and increments its count (up-counts) in response to the reference signal generated by the pulse synthesizing circuit 22 to start time measurement when the display mode is shifted to the power save mode, and stops time measurement when the power save mode is shifted to the display mode. In this way, the power save mode running time is measured as a count value.

When the power save mode is shifted to the display mode, the up-down counter decrements its count (down-counts), and the drive control circuit 24 outputs fast hand driving pulses to the second hand drive unit 30S and the hour/minute hand drive unit 30HM during the down counting.

At the moment the count of the up-down counter reaches zero, in other words when a fast hand driving period corresponding to the power save mode running time has elapsed, a control signal for stopping the issue of the fast hand driving pulse is generated and is fed to the second hand drive unit 30S and the hour/minute hand drive unit 30HM. As a result, the time display presensts the current time. The time information memory 96 has the function of bringing the time display to current time.

The drive control circuit 24 produces the drive pulse corresponding to the mode in accordance with a variety of pulses output by the pulse synthesizing circuit 22. In the power save mode, the supplying of the drive pulse is stopped. Immediately after the power save mode is switched to the display mode, the fast hand driving pulse, having short pulse intervals, is supplied to the second hand drive unit 30S and the hour/minute hand drive unit 30HM as the drive pulse.

After the issue of the control signal for stopping the fast hand driving pulse, the drive pulse having normal pulse intervals is supplied to the second hand drive unit 30S and the hour/minute hand drive unit 30HM.

External Control Unit

Figure 6:
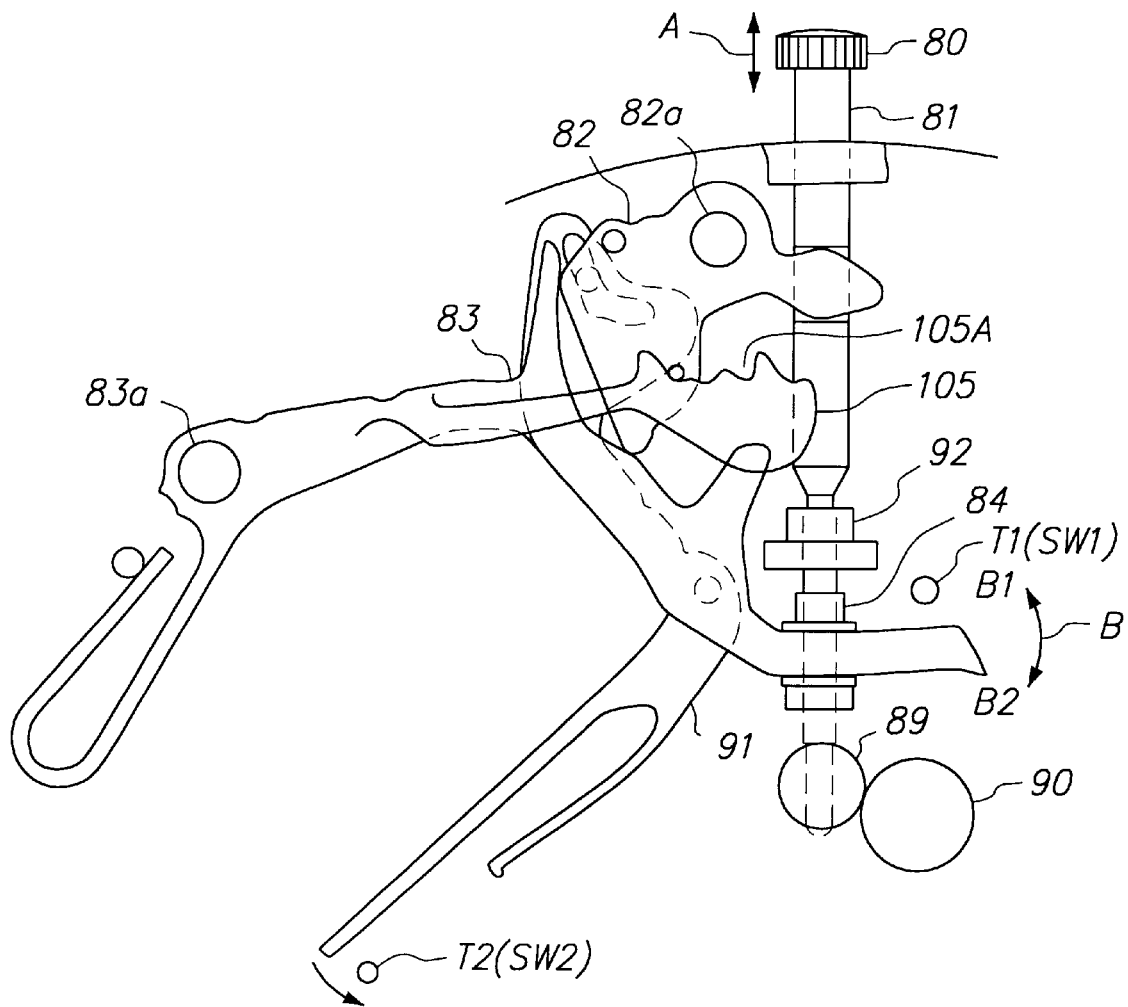
FIG. 6 shows an external control unit and its associated components.

The external control unit 100 includes, as its major components, a crown 80 functioning as a control mechanism, and a position detector for detecting an operational position of the crown 80. FIG. 6 shows the construction of the external control unit 100 and its associated components.

The external control unit 100 includes the crown 80 and a winding stem 81, and the winding stem 81 is movable in the directions of arrows A as shown.

The winding stem 81 is engaged with a setting lever 82, and the setting lever 82 is pivotally supported about its axis 82a.

The setting lever 82 pivots about its axis as the winding stem 81 moves. The setting lever 82 is set at one of three positions, namely, zero position, a first-step pulled position, and a second-step pulled position, by a click 105A of a pressure member 105. With the setting lever 82 set at one of the three positions, the winding stem 81 is set to one of a normal hand driving state, a calendar correction state, or time setting state. The setting lever 82 is engaged with a yoke 83, and the yoke 83 is pivotally supported about its axis 83a. As the setting lever 82 moves, the yoke 83 pivots in the directions of arrows B.

The yoke 83 is engaged with a clutch wheel 84 movable along the winding stem 81, and the clutch wheel 84 is moved along the winding stem 81 when the yoke 83 is pivoted.

When the yoke 83 is pivoted in the direction of arrow B1, it reaches the first-step pulled position, contacts a terminal T1 forming the first switch SW1, and thereby turns the first switch SW1 on.

When the winding stem 81 is moved further, the yoke 83 is pivoted in the direction of arrow B2 as shown. A setting wheel 89 is arranged below the clutch wheel 84 as shown. When the winding stem 81 is set to the time setting state (the second-step pulled position), the yoke 83 is separated from the terminal T1 forming the first switch SW1, and turns the first switch SW1 off. The yoke 83 moves the clutch wheel 84 downward, causing it to engage with the setting wheel 89.

When a train wheel setting lever 91 is pivoted in the direction of arrow C, as shown, and reaches the second-step pulled position, the train wheel setting lever 91 contacts a terminal T2 constituting the second switch SW2, thereby turning off the second switch SW2.

When the winding stem 81 is turned after it is located at the second-step pulled position, its rotation is transferred from the clutch wheel 84 to the setting wheel 89, and then from the setting wheel 89 to the minute wheel 90. In this way, the unshown center wheel and hour wheel, in mesh with the minute wheel 90, are turned for time correction.

When the winding stem 81 is in the time correction position (at the second-step pulled position), the setting lever 82 moves the train wheel setting lever 91, thereby causing the train wheel setting lever 91 to stop the unshown second wheel while resetting the electronic circuitry.

A calendar corrector wheel 92 is rotatably supported about the winding stem 81. When the winding stem 81 is set to the calendar correction position, the yoke 83 moves the clutch wheel 84 upwards, causing the clutch wheel 84 to engage with the first calendar corrector wheel 92. As the winding stem 81 turns, the first calendar corrector wheel 92 is rotated, and thereby rotates an unshown second calendar corrector wheel and a calendar corrector wheel in mesh with the second calendar corrector wheel. The date indicator, always in mesh with the calendar corrector wheel, is rotated, thus performing calendar correction.

The states of the first switch SW1 and the second switch SW2 in the above operation are summarized as follows:

|  | zero-step | ←→ | first-step pulled | ←→ | second-step pulled |
|---|---|---|---|---|---|
| SW1 | OFF | ←→ | ON | ←→ | OFF |
| SW2 | OFF | ←→ | OFF | ←→ | ON |

The position detector in the external control unit and the position detection related operation are now discussed with reference to FIG. 7 and FIGS. 8A and 8B.

Figure 7:
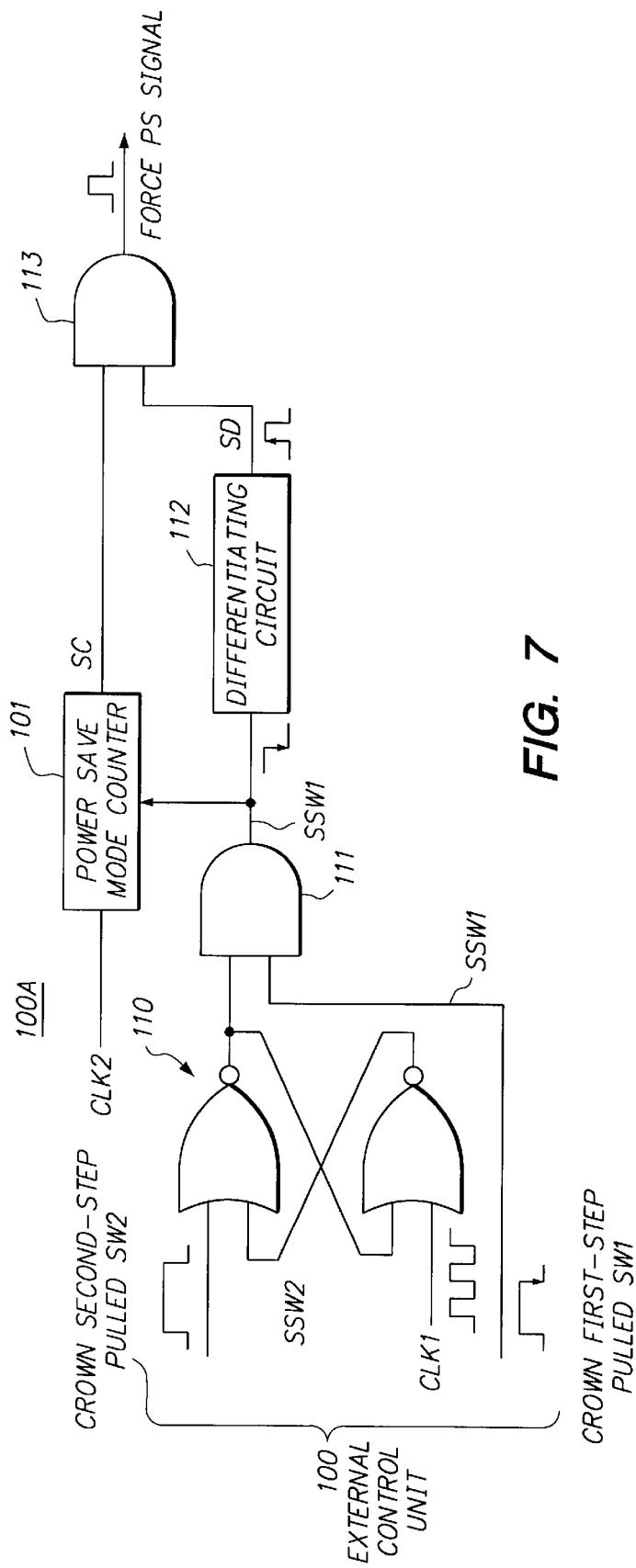
FIG. 7 is a block diagram showing a position detector in the external control unit.

Referring to FIG. 7, the position detector 100A includes a latch circuit 110 which captures and holds a second switch state signal SSW2 at the rising edge of a first clock signal CLK1 as a latch timing when the second switch state signal SSW2, corresponding to the state of the second switch SW2, is transitioned from an "H" level to an "L" level, an AND gate 111 with its one input terminal connected to the latch circuit and the other input terminal receiving a first switch state signal SSW1 corresponding to the ON/OFF state of the first switch SW1, a differentiating circuit 112 for differentiating the output of the AND gate 111 to output a differentiated signal SD, and an AND gate 113 for AND gating the count signal SC from the power save mode counter 101 and the differentiated signal SD to output a force PS (power save) signal PS.

The latch circuit 110 in the position detector 100A captures and holds the second switch state signal SSW2, corresponding to the state of the second switch SW2 at the rising edge of the first clock signal CLK1 as a latch timing when the second switch state signal SSW2 is transitioned from an "H" level to an "L" level. The first clock signal CLK1 is a clock signal that is initialized with the second switch state signal SSW2 at an "H" level, and is output with the second switch state signal SSW2 at an "L" level. The first clock signal CLK1 is transitioned from an "L" level to an "H" level after the time corresponding to the frequency of the first clock signal CLK1 elapses subsequent to the transition of the second switch state signal SSW2 from an "H" level to an "L" level.

The AND gate 111 functions as a gate that blocks the flow of the first switch state signal SSW1 to the power save mode counter 101 and the differentiating circuit 112 until the first clock signal CLK1 is transitioned to an "H" level after the winding stem 81 is disengaged from the second-step pulled position. Specifically, the releasing of the time setting in which the winding stem 81 is moved in the order of the second-step pulled position→the first-step pulled position→zero step position is distinctly discriminated from a force power save mode operation in which the winding stem 81 is moved in the order of the zero step position→the first-step pulled position→the zero step position.

When the first switch state signal SSW1 is transitioned to an "H" level, the power save mode counter 101 starts counting, and keeps the count signal SC at an "H" level until a predetermined count time has elapsed.

In parallel with this action, the differentiating circuit 112 differentiates the output of the AND gate 111, thereby outputting the differentiated signal SD. In other words, the differentiating circuit 112 detects the falling edge of the first switch state signal SS1, thereby outputting an "H" level differentiated signal SD.

Figure 8B:
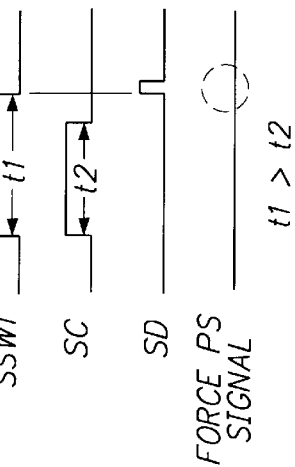
FIGS. 8A and 8B are explanatory views showing the operation of the position detector.
Figure 8A:
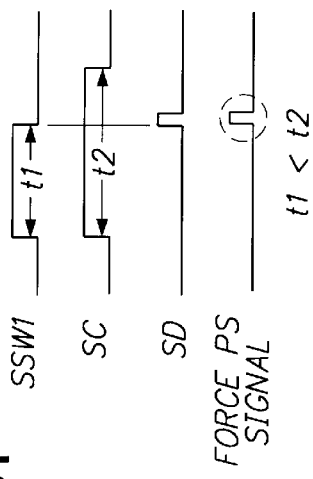

When the "H" level differentiated signal SD is output while the count signal SC is at an "H" level as shown FIG. 8A, the AND gate 113 outputs the force PS (power save) signal.

Specifically, when the winding stem 81 is moved in the order of the zero step position→the first-step pulled position→the zero step position during the "H" level period of the count signal SC, i.e., during the set time T1 (see FIG. 11), it is determined that the operator, such as the user, commands the device to shift to the force power save mode.

In contrast, when the "H" level differentiated signal SD is output during an "L" level period of the count signal SC after the set time T1 elapses as shown in FIG. 8B, the AND gate 113 does not output a force PS (power save) signal.

Specifically, the calendar correction release operation, in which the winding stem 81 is operated to take a series of positions of the first-step pulled position the zero step position during the "L" level period of the count signal SC after the set time T1 elapses, is distinctly discriminated from the already discussed shifting operation to the force power save mode, in which the winding stem 81 takes a series of positions of the zero step position→the first-step pulled position →the zero step position.

Figure 9:
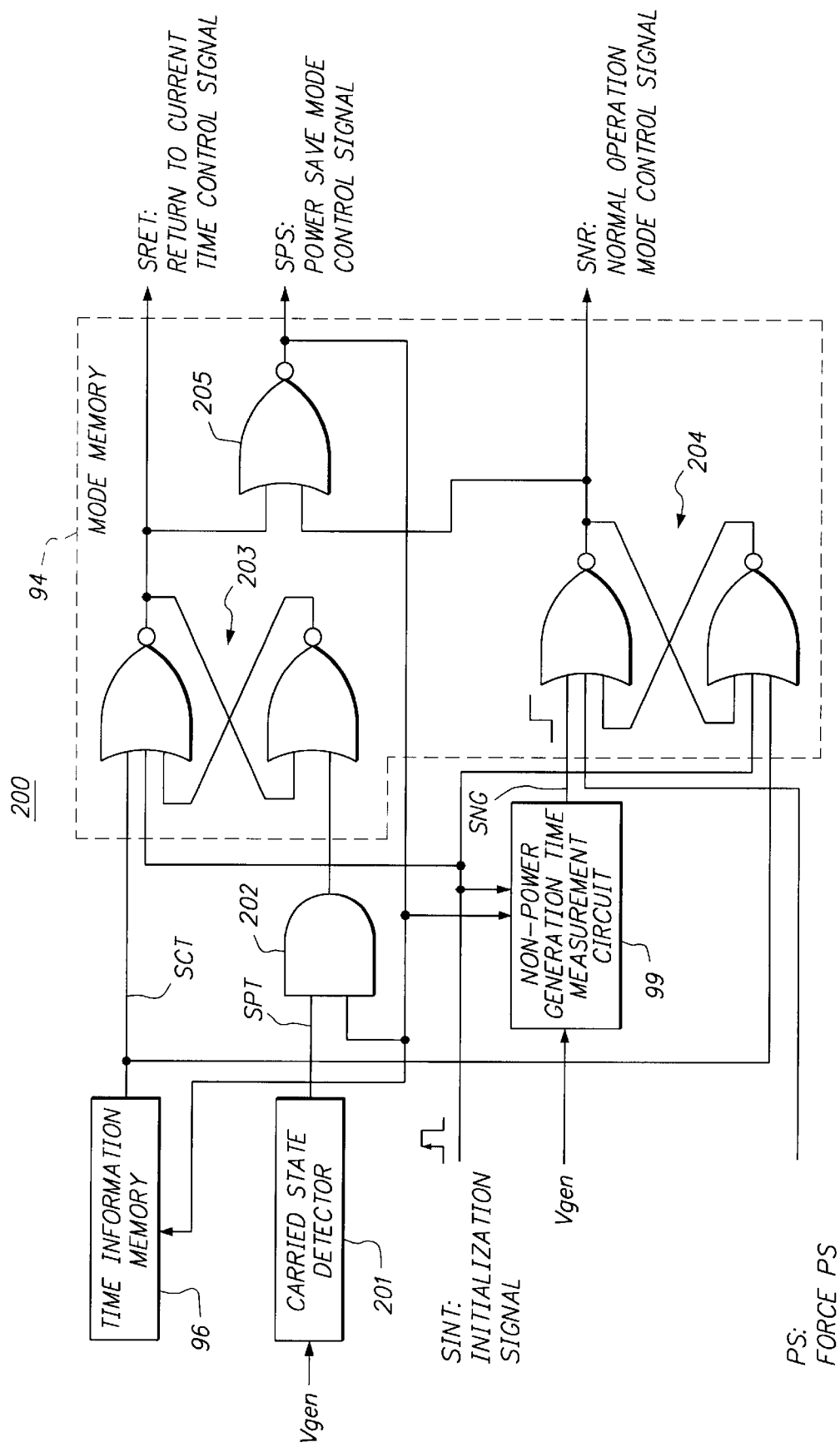
FIG. 9 is a block diagram of a mode control unit.

The mode control unit for performing the function of the operation mode control is discussed with reference to FIG. 9.

The mode control unit 200 includes the time information memory 96, which includes an up-down counter, stores the power save mode running time by upcounting the counter, down-counts the power save mode running time to return to current time, and provides its count signal SCT, which is at an "L" level when the count is other than zero. A carried state detector 201 outputs an "H" level carried state detection signal SPT in response to the voltage Vgen generated by the generator 40 when the time measurement device is in its carried state. AND gate 202 receives the carried state detection signal SPT at one input terminal, and receives at the other input terminal a power save mode control signal SPS. SPS is driven to an "H" level in the power save mode. A non-power generation time measurement circuit 99 measures the elapsed time from the start of the non-power generation time in response to the voltage Vgen generated by the generator 40, and outputs an "H" level non-power generation elapsed time SNG after the elapse of a predetermined non-power generation time. A mode memory 94 receives the count signal SCT, the output signal of the AND gate 202, the initialization signal SINT, and the force power save mode signal PS. Mode memory 94 outputs a return to current time control signal SRET corresponding to the operation mode of the time measurement device, a power save mode control signal SPS, and a normal operation mode control signal SNR.

The mode memory 94 includes a first latch circuit 203 that latches the count signal SCT at the timing of the rising edge of the output signal of the AND gate 202 and provides as its output the return to current time control signal SRET. A second latch circuit 204 latches the non-power generation elapsed time SNG at the timing of the rising edge of the count signal SCT, and provides as its output the normal operation mode control signal SNR. NOR gate 205 receives as inputs the return to current time control signal SRET and the normal operation control signal SNR, and provides as its output the power save mode control signal SPS.

The operation of the mode control unit 200 is discussed as follows. In this case, the mode control unit 200 is in its normal operation mode at the start of the operation.

Specifically, the return to current time control signal SRET="L", the power save mode control signal SPS="L", and the normal operation control signal SNR="H".

When the voltage Vgen generated by the generator 40 is below a predetermined voltage, the non-power generation time measurement circuit 99 measures the non-power generation elapsed time. At the moment the predetermined non-power generation time elapses, the non-power generation time measurement circuit 99 drives the non-power generation elapsed time SNG to an "H" level. As a result, the normal operation control signal SNR output by the second latch circuit 204 is driven to an "L" level, while the power save mode control signal SPS output by the NOR gate 205 is driven to an "H" level, and the time measurement device is switched to the power save mode.

Along with this process, the time information memory 96 is activated to store the time of operation in the power save mode by up-counting the running time, and its count signal SCT is at an "L" level because the count is other than zero.

When the carried state detector 201 detects a carried state, it drives the carried state detection signal SPT to an "H" level, the output of the AND gate 202 is driven to an "H" level, and the first latch circuit 203 drives the return to current time control signal SRET to an "H" level.

The time measurement device continues the return to current time process until the count in the time information memory 96 reaches zero. When the time information memory 96 reaches a zero count, the return to current time process is complete, and the time information memory 96 drives the count signal SCT to an "H" level.

As a result, the normal operation control signal SNR, which is the output of the second latch circuit 204, is driven to an "H" level, thereby causing the time measurement device to return to the normal operation mode.

When the force power save signal PS is driven to an "H" level, the power save mode is entered in the same manner as when the non-power generation time measurement circuit 99 has measured the predetermined non-power generation time.

Figure 10:
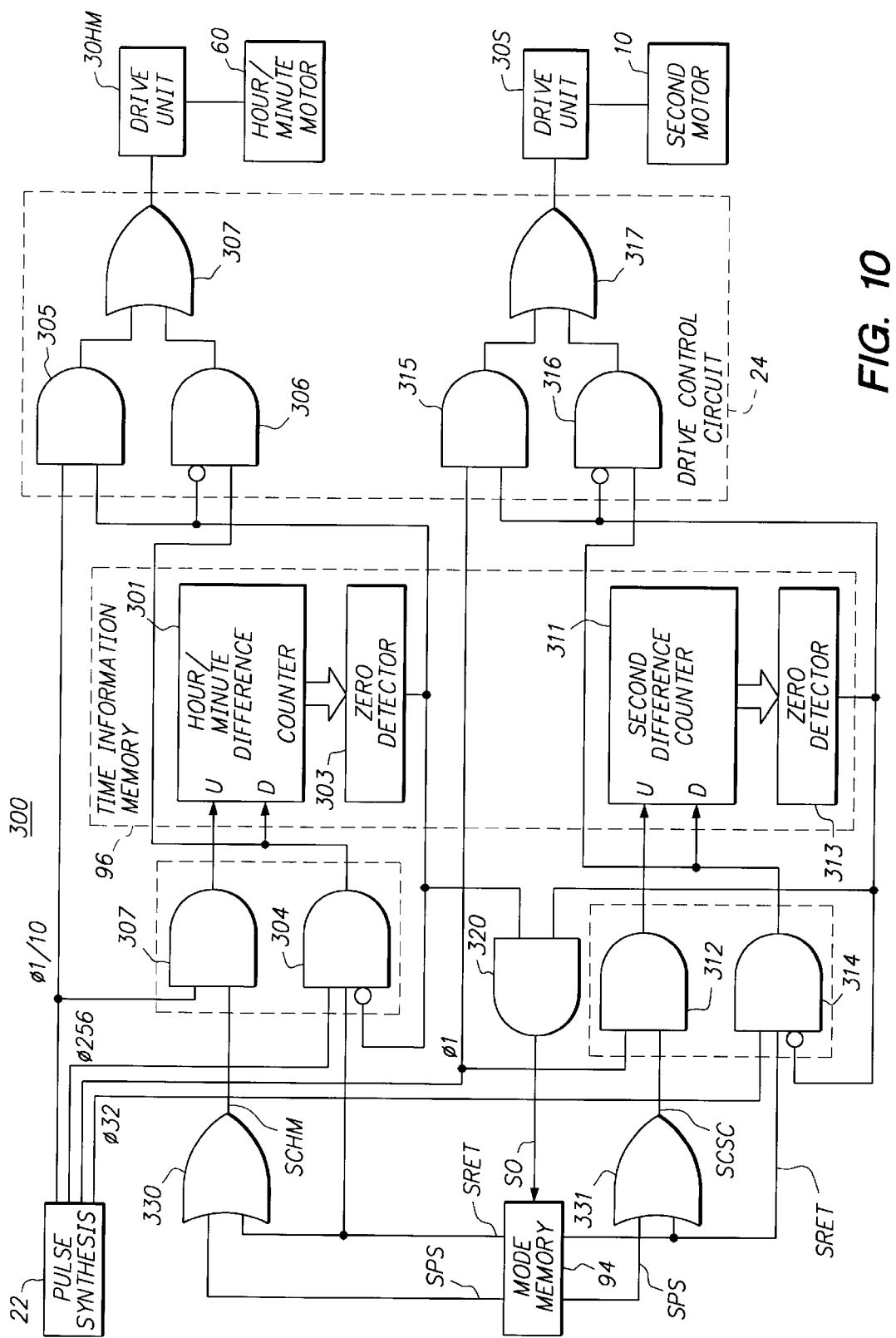
FIG. 10 is a block diagram of a return to current time unit.

The return to current time unit for performing the function of returning the time measurement device to current time is now discussed, with reference to FIG. 10.

The return to current time unit 300 includes the pulse synthesizing circuit 22 which generates and outputs a pulse signal $\phi 1$ providing one pulse per second, a pulse signal $\phi 1/10$ providing one pulse per ten seconds, a pulse signal $\phi 32$ providing 32 pulses per second, and a pulse signal $\phi 256$ providing 256 pulses per second.

The pulse signal $\phi 1$ is used to drive the second hand in the normal operation mode, and the pulse signal $\phi 1/10$ is used to drive the hour/minute hands in the normal operation mode.

The pulse signal $\phi 32$ is used to drive the second hand up to the current time with the fast hand driving pulse, and the pulse signal $\phi 256$ is used to drive the hour/minute hands up to the current time with the fast hand driving pulses.

The return to current time unit 300 includes the time information memory 96, the drive control circuit 24, the hand drive unit 30HM, the hand drive unit 30S, the hour/minute motor 60, and the second motor 10.

The return to current time unit 300 further includes an AND gate 307 that receives the pulse signal $\phi 1/10$ at one input terminal and, at the other input terminal receives an hour/minute count signal SCHM output by an OR gate 330. AND gate 307 outputs a signal that causes an hour/minute difference counter 301, which is an up-down counter in the time information memory, to up-count a difference between the current (actual) time and the time indicated by the hour and minute hands which are stopped when a power save mode is initiated. A zero detector 303 determines whether the count in the hour/minute difference counter 301 is zero, i.e., whether the time indicated by the hour and minute hands coincides with the current (actual) time. An AND gate 304 receives the inverted output of the zero detector 303 at its first input terminal, the return to current time control signal SRET at its second input terminal, and the pulse signal $\phi 256$ at its third input terminal. AND gate 304 outputs a signal that causes the hour/minute difference counter 301 to down-count during the return to current time process. An AND gate 305 receives the pulse signal $\phi 1/10$ at one input terminal and the output of the zero detector 303 at the other input terminal. An AND gate 306 receives the output signal of the AND gate 304 at one input terminal and the inverted output of the zero detector 303 at the other input terminal. An OR gate 307 exclusively outputs one of the pulse signal $\phi 1/10$ (during the normal operation mode), namely, the output of the AND gate 305, and the pulse signal $\phi 256$ (during the return to current time process), namely, the output of the AND gate 306.

The return to current time unit 300 further includes an AND gate 312 that receives the pulse signal $\phi 1$ at one input terminal and, at the other input terminal receives a second count signal SCSC output by an OR gate 331. AND gate 312 outputs a signal that causes a second difference counter 311, which is an up-down counter in the time information memory, to up-count a difference between the current (actual) time and the time indicated by the second hand which is stopped when a power save mode is initiated. A zero detector 313 determines whether the count at the second difference counter 311 is zero, i.e., whether the current time indicated by the second hand coincides with the displayed time. An AND gate 314 receives the inverted output of the zero detector 313 at its first input terminal, the return to current time control signal SRET at its second input terminal, and the pulse signal φ32 at its third input terminal. AND gate 314 outputs a signal that causes the second difference counter 311 to down-count during the return to current time process. An AND gate 315 receives the pulse signal φ1 at one input terminal and the output of the zero detector 313 at the other input terminal. An AND gate 316 receives the output signal of the AND gate 314 at one input terminal and the inverted output of the zero detector 313 at the other input terminal. An OR gate 317 exclusively outputs one of the pulse signal φ1 (during the normal operation mode), namely, the output of the AND gate 315, and the pulse signal φ32 (during the return to current time process), namely, the output of the AND gate 316.

The return to current time unit 300 further includes an AND gate 320 that receives the outputs of the zero detector 303 and the zero detector 313, and outputs a zero detection signal S0. An OR gate 330 receives the return to current time control signal SRET at one input terminal and the power save mode control signal SPS at the other input terminal, and outputs an hour/minute count signal SCHM by OR gating the two input control signals. An OR gate 331 receives the return to current time control signal SRET at one input terminal and the power save mode control signal SPS at the other input terminal, and outputs the second count signal SCSC by OR gating the two input control signals.

The operation of the return to current time unit 300 is discussed as follows.

When the mode memory 94 outputs an "L" level for both the power save mode control signal SPS and the return to current time control signal SRET, the AND gate 307, AND gate 304, AND gate 312, and AND gate 314 all output "L" level output signals.

Specifically, the pulse signal φ1/10 is output to the drive unit 30HM through the AND gate 305 and OR gate 307. The drive unit 30HM drives the hour/minute motor 60, thereby driving the hour and minute hands every 10 seconds. The pulse signal φ1 is output to the drive unit 30S through the AND gate 315 and OR gate 317. The drive unit 30S drives the second motor 10, thereby driving the second hand every second.

When the mode memory 94 outputs an "H" level power save mode control signal SPS, the AND gate 307 outputs the pulse signal φ1/10 causing the hour/minute difference counter 301 to up-count. The hour/minute difference counter 301 thus counts the difference between the current (actual) time and the time indicated by the hour and minute hands which are stopped as a result of the power save mode being initiated.

Since the output of the zero detector 303 is then at an "L" level and the return to current time control signal SRET is also then at an "L" level, the AND gate 304, AND gate 305, and AND gate 306 are all at an "L" level, and no signal is output to the drive unit 30HM. The hour and minute hands are thus stopped.

Similarly, the AND gate 312 outputs the pulse signal φ1 causing the second difference counter 311 to up-count. The second difference counter 311 up-counts the difference between the current (actual) time and the time indicated by the second hand which is stopped as a result of the power save mode being initiated.

Since the output of the zero detector 313 is then at an "L" level and the return to current time control signal SRET is also at an "L" level, the AND gate 314, AND gate 315 and AND gate 316 are all at an "L" level, and no signal is output to the drive unit 30S. The second hand is thus stopped when the power save mode is initiated.

At the point when an "H" level return to current time control signal SRET is output, the output of the zero detector 303 is at an "L" level with its inverted form at an "H" level. The AND gate 304 outputs the pulse signal φ256 causing the hour/minute difference counter 301 to down-count while outputting the pulse signal φ256 to the AND gate 306.

Even during the return to current time process, i.e. during fast down-counting of counter 301, the hour/minute difference counter 301 up-counts at the timing of the less frequent pulse signal φ1/10, and the return to current time process thus accounts for the time elapsed during the return to current time action.

As a result, the AND gate 306 outputs the pulse signal φ256 to the drive unit 30HM, and the drive unit 30HM drives the hour/minute motor 60, thereby fast driving the hour and minute hands every 1/256 second.

When the output of the zero detector 303 transitions to an "H" level, the time indicated by the hour and minute hands coincides with the current time, and the pulse signal φ1/10 is again output to the drive unit 30HM via the AND gate 305 and OR gate 307. The drive unit 30HM drives the hour/minute motor 60, thereby driving the hour and minute hands every 10 seconds for normal operation.

At the point when an "H" level return to current time control signal SRET is output, the output of the zero detector 313 is at an "L" level with its inverted form at an "H" level. The AND gate 314 outputs the pulse signal φ32 causing the second difference counter 311 to down-count, while outputting the pulse signal φ32 to the AND gate 316.

As a result, the AND gate 316 outputs the pulse signal φ32 to the drive unit 30S, and the drive unit 30S drives the second motor 10, thereby fast driving the second hand every 1/32 second.

When the output of the zero detector 303 is transitioned to an "H" level, the indication by the second hand coincides with the current time. The pulse signal φ1 is again output to the drive unit 30S via the AND gate 315 and OR gate 317, and the drive unit 30S drives the second motor 10, thereby driving the second hand every second for normal operation.

Operation of the Embodiment

Figure 11:
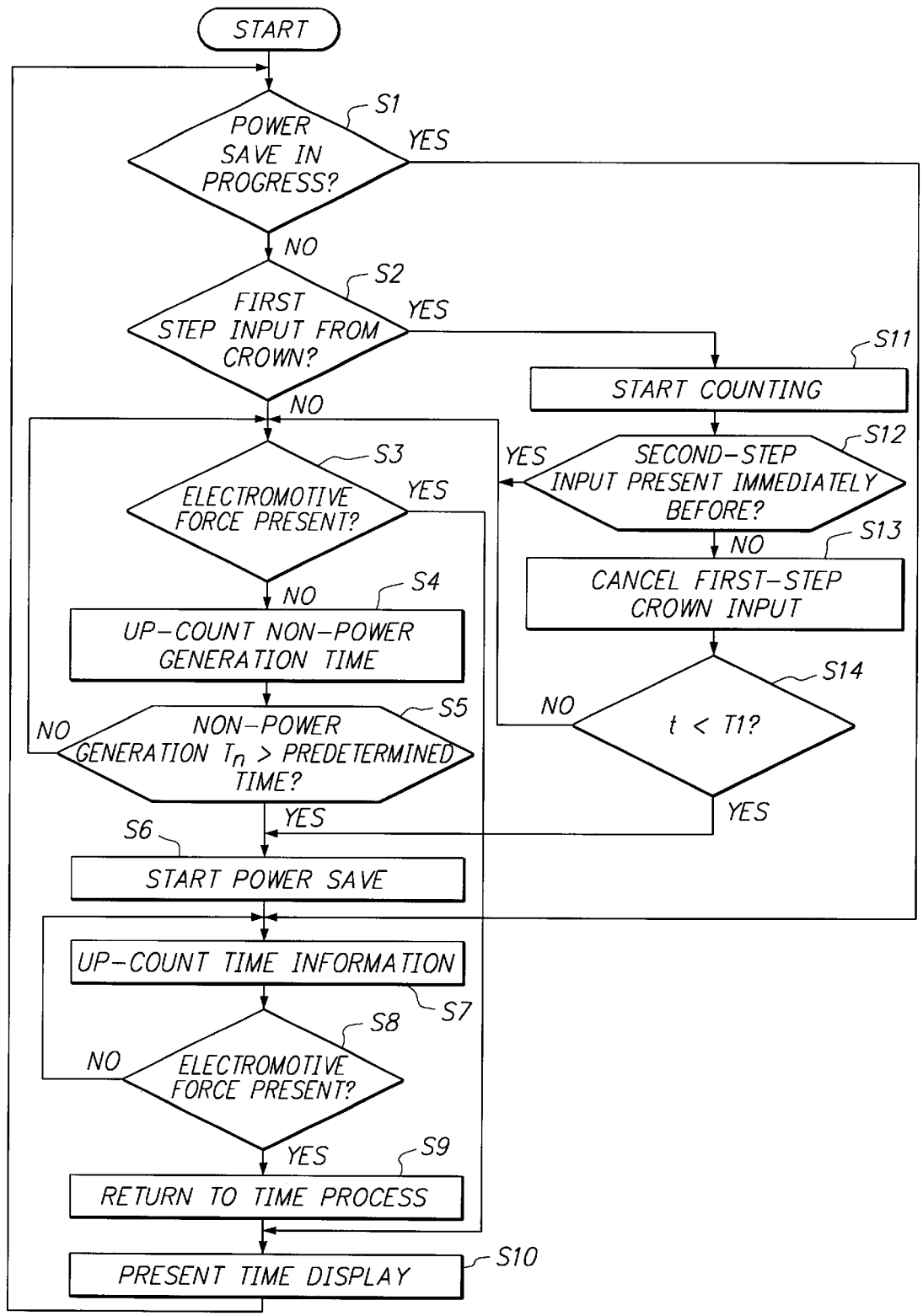
FIG. 11 is an operational flow diagram of the embodiment.

FIG. 11 shows an operational flow diagram focusing on the shifting of the time measurement device into the force power save mode in the embodiment of the present invention.

In the following discussion, the crown 80 (i.e., winding stem 81) as the external control unit has the following operational positions (if represented by X): the display mode at the most pressed in position (X=0, zero step position), the calendar correction position with the crown pulled out by one step (X=1; one-step pulled position), and the time setting position with the crown pulled out by two steps (X=2, two-step pulled position).

The controller 23 determines whether the time measurement device is in the power save mode (step S1).

When it is determined in step S1 that the time measurement device is in the power save mode (Yes in step S1), the process goes to step S7 to be described later.

When it is determined in step S1 that the time measurement device is not in the power save mode, in other words, in the display mode that is the normal operation mode (No in step S1), it is determined whether the operational position X of the crown switch, as the external operation control, is in the operation mode for the calendar correction mode (X=1) (step S2).

When it is determined in step S2 that the crown switch is not at the operational position for the calendar correction mode (X=1) (No in step S2), the process goes to step S3.

When it is determined in step S2 that the crown switch is at the operational position for the calendar correction mode (X=1) (Yes in step S2), the power save mode counter is initialized (to t=0) with its count being used to determine whether to shift to the power save mode, and starts the counting of the count t (step S11).

It is then determined whether the crown switch is at the operational position for the time setting mode (X=2), i.e., the crown switch is shifted in the order of X=2→1→0 or X=0→1→0 (step S12).

When it is determined in step S12 that the crown switch is at the operational position for the time setting mode (X=2) (Yes in step S12), the crown switch has been shifted in the order of X=2→1→0. The process does not go to the power save mode, but to step S3.

When it is determined in step S12 that the crown switch is not at the operational position for the time setting (X=2) (No in step S12), the process waits in standby until the operational position X of the crown switch becomes X≠1 (step S13), and it is then determined whether the count t at the power save mode counter is less than the power save mode shifting criterion time T1 (step S14).

When it is determined in step S14 that the count t in the power save mode counter 101 is less than the power save mode shifting criterion time T1 (Yes in step S14), i.e., the operational position X of the crown switch has taken the following positions X=0→1→0 within the power save mode shifting criterion time T1, the power save mode is entered with the assumption that the operator, such as the user, issues a command to shift into a forced power save mode (step S6).

Specifically, the controller 23 causes the mode memory to store the power save mode. In this, the drive control circuit 24 controls the second hand drive unit 30S and the hour/minute hand drive unit 30HM, thereby stopping the hour/minute motor and the second motor.

Next, the time information memory 96 up-counts the time information (step S7) corresponding to the power save mode running time to perform the return to current time process (see step S9) to be described later, and determines whether the generator 40 generates power equal to or higher than a predetermined electromotive force that serves as a criterion as to whether or not to shift to the display mode (step S8).

When it is determined in step S8 that the generator 40 fails to generate power equal to or higher than the predetermined electromotive force that serves as a criterion whether or not to shift to the display mode, in other words, it is determined that the time measurement device needs to continue the power save mode (No in step S8), the process returns to step S7, and the time information corresponding to the elapsed time of the power save mode is continually up-counted.

When it is determined in step S8 that the generator 40 generates power equal to or higher than the predetermined electromotive force that serves as a criterion whether or not to shift to the display mode, in other words, it is determined that the time measurement device is able to shift to the display mode (Yes in step S8), the time measurement device switches the operation mode from the power save mode to the display mode, and performs the return to current time process in accordance with the count in the time information memory 96 (step S9). Specifically, the time information memory 96 down-counts its count and the pulse signal for the fast hand driving is provided until the time information memory 96 reaches the zero count.

The time display continues (step S10), and the process returns to step S1 to repeat the same steps.

It can be determined in step S14 that the count t in the power save mode counter is equal to or greater than the predetermined power save mode shifting criterion time T1 (No in step S14). This determination is made when the crown switch takes T1 or longer to shift positions such as in X=1→0. In this situation, it is determined that the crown has been returned to the zero position by the user after performing another operation, such as calendar correction, rather than manipulating the crown to initiate a command to shift to the force power save mode. The process then goes to step S3.

In response to the detection signal from the generation state detector 91, the central control circuit 93 determines whether there is an electromotive force, i.e., whether the generator 40 generates power (step S3). When it is determined in step S3 that there is an electromotive force (Yes in step S3), the process goes to step S10 and the time displaying continues (step S10), and the process starts over with step S1.

When it is determined in step S3 that there is no electromotive force, i.e., no power is generated (No in step S3), the non-power generation time measurement circuit 99 in the central control circuit 93 up-counts the non-power generation time Tn (step S4). The central control circuit 93 determines whether the non-power generation time Tn has continued in excess of a predetermined time (step S5).

When it is determined in step 5 that the non-power generation time Tn has yet to reach the predetermined time (No in step S5), the process returns to step S3 to repeat steps S3 through S5. When it is determined in step 5 that the non-power generation time Tn has continued in excess of the predetermined time, the time measurement device automatically stops the time displaying and shifts to the power save mode (step S6).

After performing steps S7 through S10, the time measurement device returns back to step S1 to repeat the same steps.

Advantages of the Embodiment

As discussed above, the time measurement device 1 of this embodiment stops the time displaying (i.e. stops the hands) and shifts into the power save mode in the absence of power generation, and resumes the time displaying when power generation is detected. The operator, such as the user, may force the time measurement device 1 into the power save mode at the operator's discretion by manipulation of the crown. With this arrangement, energy stored in the high-capacitance capacitor 48 is effectively conserved.

Specifically, the time measurement device 1 measures the non-power generation time Tn, and will not shift into the power save mode unless the non-power generation time exceeds a predetermined time. Since the operator, such as the user, can arbitrarily (forcibly) cause the time measurement device 1 to shift into the power save mode by operating the crown as the external control unit, energy saving can be.

In the time measurement device 1 of this embodiment, the crown is operated to force shift into the power save mode, and other operations (e.g., time setting operation) require particular steps which are different from those in the force power save mode in terms of the time required to complete each operation and the transitional states of each operation. The operator, such as the user, is prevented from making an erroneous shift into the power save mode, and the ease of use of the time measurement device is maintained.

Modifications of the Embodiment
First Modification

The above embodiment has been discussed in conjunction with the time measurement device, which presents time display using analog hands driven by the stepper motor 10 and the stepper motor 60. The present invention may be implemented in a digital time measurement device, in which the time display uses an LCD, for example. In such a case, the operator, such as the user, forces the device into the power save mode, saving power consumed by the LCD and allowing the device to continuously measure time for a longer period of time.

Second Modification

The above embodiment has been discussed in conjunction with the time measurement device, which simultaneously stops two stepper motors 10 and 60 to shift into the power save mode. The power save mode may be divided in two phases: in a first phase, only the stepper motor 10 for the second hand is stopped, and in a second phase of the power save mode, the stepper motor 60 for the hour and minute hands is also stopped.

Third Modification

The above embodiment has been discussed in conjunction with the time measurement device having the two motors for indicating the hour, the minute and the second. The present invention may be implemented in a time measurement device which employs a single motor for indicating the hour, the minute and the second. Alternatively, the present invention may be implemented in a time measurement device that employs three or more motors.

Fourth Modification

Employed as the generator 40 in the above embodiment is an electromagnetic generator, in which the rotary motion of the oscillating weight 45 is transferred to the rotor 43, and the voltage Vgen is generated in the output coil 44 in response to the rotation of the rotor 43. The present invention is not limited to this arrangement. For example, the generator 40 may be one in which an electromotive force is generated by a rotary motion that is caused by the restoring force of a mainspring, or may be one in which externally generated vibration or displacement or self-generated vibration or displacement may be exerted on a piezoelectric member to generate power by means of a piezoelectric effect.

The generator 40 may be one which generates power through photoelectric conversion, taking advantage of sunlight or the like.

The generator 40 may be one which generates power through a temperature difference between one location and another location.

A plurality of above generators may be arranged. Each generator having its power generation principle suited to a given condition of usage may be singly used to generate power, or the plurality of generators may be concurrently used to generate power.

Fifth Modification

The above embodiment has been discussed in conjunction with the time measurement device 1 of a wristwatch type. The present invention is not limited to the wristwatch. For example, the present invention may be applied to a pocket watch. The present invention may be applied to portable electronic devices including a calculator, a portable telephone, a portable personal computer, an electronic pocketbook, a portable radio, and a portable video tape recorder.

Sixth Modification

In the above embodiment, the reference potential (GND) is set to Vdd (high potential side), but the reference potential (GND) may be set to Vss (low potential side). In such a case, set voltage values Vo and Vbas mean the potential difference to a detection level set to the high potential side with respect to Vss.

Seventh Modification

In the above embodiment, the shifting to the power save mode from the display mode is performed in accordance with to the position detection of the crown. The present invention is not limited to this arrangement. For example, the operational state of a button arranged on the case of the time measurement device 1 may be detected, and the display mode may be shifted to the power save mode in accordance with the detected operational state. Alternatively, an electromagnetic switch may be employed, and in such a case, the device may be forced into the power save mode in a plant or by retailers.

Eighth Modification

In the above embodiment, when power generation is detected, the operation mode is shifted back to the display mode after leaving the power save mode. A shift inhibit mode may be introduced which prevents the shifting from the power save mode to the normal operation mode when a predetermined condition is met.

For example, a portable electronic device in the power save mode may be transported even when not in use. When power generation is detected in the course of transportation, the normal operation mode is entered by releasing the power save mode, and unnecessary power consumption occurs even though the device is not being used.

In such a case, the portable electronic device may be set to the shift inhibit mode so that the shifting to the normal operation mode is inhibited, thus preventing unnecessary power consumption.

One example of the predetermined condition may be that in a portable electronic device in a power save mode, for example in the above time measurement device 1, the control (the crown) is left in the one-step pulled position. In a portable electronic device having a plurality of buttons or switches, a particular number (preferably three or more) of buttons or switches is set to a predetermined operational state to switch between the power save mode and the shift inhibit mode.

The device is shifted to the shift inhibit mode not only from the power save mode but also from the normal operation mode through a similar and predetermined operation. The device is forced into the power save mode and then to the shift inhibit mode.

The operator, such as the user, can thus shift the device into the shift inhibit mode at the user's discretion, and during use (or during storage), power consumption is optimally reduced.

Ninth Modification

In the above discussion, the hour/minute motor 60 and the second motor 10 utilize the same timing at which the "H" level return to current time control signals SRET are output during the return to correct time process. The timings for the "H" level return to current time control signals SRET for the hour/minute motor 60 and the second motor 10 may be separated so that the return to current time timings do not coincide with each other. With this arrangement, an instantaneous and sharp rise in power consumption is minimized and a reliable operation of the device thus results.

The following two methods are contemplated to separate the return to current time timings between the hour/minute hands and the second hand.

(1) The hand driving timings are separated in time between the hour/minute hands and the second hand. Specifically, the second hand is returned to the current time after the hour and minute hands are returned to the current time. When the hand driving timing for the normal hand driving of the hour and minute hands comes in the middle of the return to current time process of the second hand, after the return to current time of the hour and minute hands, the return to current time process for the hour and minute hands is performed again subsequent to the return of the second hand.

(2) The return to current time processes for the hour and minute hands and the second hand are performed in parallel in a manner such that the motor pulses for the hour and minute motor and the second motor are not overlapped. With this arrangement, it appears to the user as if the hour and minute hands and the second hand concurrently return to the current time, but the motor pulses for the two motors are not overlapped, and no sharp increase occurs in power consumption.

Advantages

In accordance with the present invention, the operator, such as the user, forces the time measurement device into the power save mode by manipulating the control. Electrical energy stored is thus reliably saved, and needless power consumption is efficiently reduced, even more than in a method in which a device automatically stops the time display and is shifted into a power save mode in accordance with the presence or absence of power generation.

Fixing a time limit within which the operational state of the control needs to be complete, the operator, such as the user, is prevented from an erroneous shift into the power save mode, and the ease of use of the time measurement device is still assured.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A portable electronic device comprising power generating means which performs power generation by converting first energy into second energy that is electrical energy,
    power source means for storing electrical energy resulting from the power generation,
    driven means for being driven by the electrical energy supplied by the power source means,
    operation means on which an operator, such as a user, performs a diversity of operations,
    operational state determining means for determining whether an operational state of the operation means is a predetermined operational command state to shift into a power save mode for reducing a power consumption of the driven means, and
    operation mode control means for shifting an operation mode into the power save mode in accordance with the determination result provided by the operational state determining means, and
    wherein the operation means comprises an operation control, and
    position detector means for detecting the position of the operation control which the operator operates, and
    wherein the operational state determining means determines that the operation means is in an operational command state to shift into the power save mode if the operation control is moved from a first position to a second position and is then moved back to the first position from the second position within a predetermined duration of time.

2. A portable electronic device according to claim 1, comprising carried state detector means for detecting whether the portable electronic device is in a carried state in which an operator is carrying the portable electronic device,
    wherein, in accordance with the detection result provided by the carried state detector means, the operation mode control means shifts the operation mode of the driven means from a normal operation mode to the power save mode to reduce the power consumption of the driven means when the electronic device is in a non-carried state.

3. A portable electronic device according to claim 2, wherein based on a generation state of the power generating means, the carried state detector means detects whether the portable electronic device is in a carried state in which an operator is carrying the portable electronic device.

4. A portable electronic device according to claim 1, wherein the first energy is one of kinetic energy, pressure energy and thermal energy.

5. A portable electronic device according to claim 2, wherein the first energy is one of optical energy and electromagnetic energy, and
    wherein the operation mode control means shifts the operation mode of the driven means to the power save mode when the portable electronic device is in a non-carried state and when the power generating means is in a predetermined generation state corresponding to the power save mode.

6. A portable electronic device according to claim 1, wherein the driven means is time display means for presenting a time display.

7. A portable electronic device according to claim 6, wherein the operation means comprises a crown which the operator operates, and
    position detector means for detecting a position of the crown.

8. A portable electronic device according to claim 7, wherein the operational state determining means determines that the operation means is in an operational command state to shift into the power save mode if the crown is moved from a first position to a second position and is then moved back to the first position from the second position within a predetermined duration of time.

9. A portable electronic device according to claim 6, wherein the time display means comprises an analog hand for presenting an analog time display, and
    hand drive means for driving the analog hand, and
    wherein the operation mode control means comprises operation stop means for stopping the operation of the hand drive means throughout the power save mode.

10. A portable electronic device according to claim 6, comprising elapsed time counting means for counting elapsed time from the start of the power save mode, and
    return to current time display means for returning the display on the time display means to the current time, which accounts for the elapsed time in accordance with the count provided by the elapsed time counting means, when the power save mode is shifted to the normal operation mode.

11. A control method for controlling a portable electronic device comprising an operation control on which an operator, such as a user, performs a diversity of operations, power source means for storing electrical energy, and driven means which is driven by the electrical energy, the control method comprising:
    power generating step for generating power by converting first energy into second energy that is electrical energy,
    operational state determining step for determining whether an operational state of the operation control is a predetermined operational command state to shift into a power save mode for reducing a power consumption of the driven means, and operation mode control step for shifting an operation mode into the power save mode in accordance with the determination result provided in the operational state determining step, and wherein the operational state determining step comprises a position detecting step for detecting a position of the operation control, and wherein the operational state determining step determines that the operation control is in an operational command state to shift into the power save mode if the operation control is moved from a first position to a second position and is then moved back to the first position from the second position within a predetermined duration of time.

12. A control method for controlling a portable electronic device according to claim 11, comprising carried state detecting step for detecting whether the portable electronic device is in a carried state in which an operator is carrying the portable electronic device, wherein in accordance with the detection result provided in the carried state detecting step, the operation mode control step shifts the operation mode of the driven means from a normal operation mode to the power save mode to reduce the power consumption of the driven means, when the electronic device is in a non-carried state.

13. A control method for controlling a portable electronic device according to claim 12, wherein the carried state detecting step detects, based on a generation state of the power generating step, whether the portable electronic device is in a carried state in which the operator is carrying the portable electronic device.

14. A control method for controlling a portable electronic device according to claim 11, wherein the driven means is time display means for presenting a time display, the operation control is a crown which the operator operates, and the position detecting step detects a position of the crown.

15. A control method for controlling a portable electronic device according to claim 14, wherein the operational state determining step determines that the crown is in an operational command state to shift into the power save mode if the crown is moved from a first position to a second position and is then moved back to the first position from the second position within a predetermined duration of time.

16. A control method for controlling a portable electronic device according to claim 14, wherein the time display means comprises an analog hand for presenting an analog time display, and hand drive means for driving the analog hand, and wherein the operation mode control step comprises operation stop step for stopping the operation of the hand drive means throughout the power save mode.

17. A control method for controlling a portable electronic device according to claim 14, comprising elapsed time counting step for counting elapsed time from the start of the power save mode, and return to current time display step for returning the display on the time display means to the current time, which accounts for the elapsed time in accordance with the count provided in the elapsed time counting step, when the power save mode is shifted to the normal operation mode.

18. A portable electronic device comprising:

a power generator that performs power generation by converting a first energy into electrical energy;

a power source that stores said electrical energy generated by said power generator;

a driven unit that is driven by the electrical energy supplied by said power source, an operation unit that performs a plurality of operations under control of a user, an operational state determining unit that determining whether an operational state of the operation unit is a predetermined operational command state that shifts into a power save mode to reduce power consumption of the driven unit, and an operation mode controller that shifts an operation mode into the power save mode in accordance with the determination result of the operational state determining unit, and wherein the operation unit comprises an operation control, and further comprising a position detector that detects the position of the operation control that the user operates, and wherein the operational state determining unit is responsive to the position detector for determining that the operation unit is in an operational command state to shift into the power save mode if the operation control is moved from a first position to a second position and is then moved back to the first position from the second position within a predetermined duration of time.

19. A portable electronic device according to claim 18, comprising a carried state detector that detects whether the portable electronic device is carried by a user, and wherein the operation mode controller is responsive to the carried state detector for shifting the operation mode of the driven unit from a normal operation mode to the power save mode to reduce the power consumption of the driven unit when the electronic device is not being carried.

20. A portable electronic device according to claim 19, wherein the carried state detector is responsive to the power generator for detecting a generation state of the power generator to detect if the portable electronic device is carried by a user.

21. A portable electronic device according to one of claims 18, wherein the first energy is one of kinetic energy, pressure energy and thermal energy.

22. A portable electronic device according to claim 19, wherein the first energy is one of optical energy and electromagnetic energy, and wherein the operation mode controller is responsive to the carried state detector detecting that the portable electronic device is not being carried and to the power generator being in a generation state corresponding to the power save mode for shifting the operation mode of the driven unit to the power save mode.

23. A portable electronic device according to claim 18, wherein the driven unit is a time display.

24. A portable electronic device according to claim 23, wherein the operation unit comprises a crown that the user operates, and a position detector that detects a position of the crown.

25. A portable electronic device according to claim 24, wherein the operational state determining unit is responsive to the position detector for determining that the operation unit is in an operational command state to shift into the power save mode if the crown is moved from a first position to a second position and is then moved back to the first position from the second position within a predetermined duration of time.

26. A portable electronic device according to claims 23, wherein the time display comprises an analog hand for presenting an analog time display, and a hand driver that drives the analog hand, and wherein the operation mode controller comprises an operation stopper that stops the operation of the hand driver during the power save mode.

27. A portable electronic device according to claim 23, comprising an elapsed time counter that counts elapsed time from the start of the power save mode, and a return to current time display unit that advances the time display to the current time in response to a count from the elapsed time counter when the power save mode is shifted to a normal operation mode.

28. A method for controlling a portable electronic device including an operation control that performs a plurality of operations under control of a user, a power source that stores electrical energy, and a driven unit that is driven by the electrical energy, the control method comprising:

generating power by converting first energy into electrical energy, determining whether an operational state of the operation unit is a predetermined operational command state that shifts into a power save mode to reduce power consumption of the driven unit, and shifting an operation mode into the power save mode in accordance with a result of the determining step, and wherein the determining step comprises detecting a position of the operation control, and wherein the determining step determines that the operation control is in an operational command state to shift into the power save mode if the operation control is moved from a first position to a second position and is then moved back to the first position from the second position within a predetermined duration of time.

29. A method for controlling a portable electronic device according to claim 28, comprising detecting whether the portable electronic device is carried by a user, and responsive to said detecting step detecting that the portable electronic device is not being carried, shifting the operation mode of the driven unit from a normal operation mode to the power save mode to reduce power consumption of the driven unit.

30. A method for controlling a portable electronic device according to claim 29, wherein said detecting step comprises determining the generation state of the power generator.

31. A method for controlling a portable electronic device according to claim 28 comprising displaying time by the driven unit, wherein the operation control is a crown and comprising operating the crown, and said determining step comprises detecting a position of the crown.

32. A method for controlling a portable electronic device according to claim 31, wherein the determining step determines that the crown is in an operational command state to shift into the power save mode when the detecting step detects that the crown is moved from a first position to a second position and is then moved back to the first position from the second position within a predetermined duration of time.

33. A method for controlling a portable electronic device according to claim 31, wherein the displaying time step comprises displaying time with an analog hand and driving the analog hand, and wherein the shifting an operation mode into the power save mode step comprises stopping driving of the analog hand.

34. A method for controlling a portable electronic device according to claim 31, comprising:

counting elapsed time from the start of the power save mode, and advancing the time displayed by the driven unit to the current time in accordance with a count derived in said counting step, when the power save mode is shifted to the normal operation mode.

35. A portable electronic device comprising power generating means which performs power generation by converting first energy into second energy that is electrical energy, power source means for storing electrical energy resulting from the power generation, driven means for being driven by the electrical energy supplied by the power source means, operation means on which an operator, such as a user, performs a diversity of operations, operational state determining means for determining whether an operational state of the operation means is a predetermined operational command state to shift into a power save mode for reducing a power consumption of the driven means, operation mode control means for shifting an operation mode into the power save mode in accordance with the determination result provided by the operational state determining means, carried state detector means for detecting one of a carried state in which an operator is carrying the portable electronic device and a non-carried state in which the operator is not carrying the portable electronic device, timing means for measuring time following the detector means detecting the non-carried state, and wherein, in response to the timing means measuring a predetermined time, the operation mode control means shifts the operation mode of the driven means from a normal operation mode to the power save mode to reduce the power consumption of the driven means when the electronic device is in a non-carried state.

36. A portable electronic device according to claim 35, comprising elapsed time counting means for counting elapsed time from the start of the power save mode, and return to current time display means for returning the display on the time display means to the current time, which accounts for the elapsed time in accordance with the count provided by the elapsed time counting means, when the power save mode is shifted to the normal operation mode.

37. A control method for controlling a portable electronic device comprising an operation control on which an operator, such as a user, performs a diversity of operations, power source means for storing electrical energy, and driven means which is driven by the electrical energy, the control method comprising:

power generating step for generating power by converting first energy into second energy that is electrical energy, operational state determining step for determining whether an operational state of the operation control is a predetermined operational command state to shift into a power save mode for reducing a power consumption of the driven means, operation mode control step for shifting an operation mode into the power save mode in accordance with the determination result provided in the operational state determining step, carried state detecting step for detecting one of a carried state in which an operator is carrying the portable electronic device and a non-carried state in which the operator is not carrying the portable electronic device, timing step for measuring time following the carried state detecting step detecting the non-carried state, and wherein, in response to the timing step measuring a predetermined time, the operation mode control step shifts the operation mode of the driven means from a normal operation mode to the power save mode to reduce the power consumption of the driven means when the electronic device is in a non-carried state.

38. A control method for controlling a portable electronic device according to claim 37, comprising elapsed time counting step for counting elapsed time from the start of the power save mode, and return to current time display step for returning the display on the time display means to the current time, which accounts for the elapsed time in accordance with the count provided in the elapsed time counting step, when the power save mode is shifted to the normal operation mode.

39. A portable electronic device comprising:

a power generator that performs power generation by converting a first energy into electrical energy;

a power source that stores said electrical energy generated by said power generator;

a driven unit that is driven by the electrical energy supplied by said power source, an operation unit that performs a plurality of operations under control of a user, an operational state determining unit that determining whether an operational state of the operation unit is a predetermined operational command state that shifts into a power save mode to reduce power consumption of the driven unit, an operation mode controller that shifts an operation mode into the power save mode in accordance with the determination result of the operational state determining unit, a carried state detector that detects one of a carried state in which an operator is carrying the portable electronic device and a non-carried state in which the operator is not carrying the portable electronic device, a timer that measures time following the carried state detector detecting the non-carried state, and wherein, in response to the timer measuring a predetermined time, the operation mode controller shifts the operation mode of the driven unit from a normal operation mode to the power save mode to reduce the power consumption of the driven unit when the electronic device is in a non-carried state.

40. A portable electronic device according to claim 39, comprising an elapsed time counter that counts elapsed time from the start of the power save mode, and a return to current time display unit that advances the time display to the current time in response to a count from the elapsed time counter when the power save mode is shifted to a normal operation mode.

41. A method for controlling a portable electronic device including an operation control that performs a plurality of operations under control of a user, a power source that stores electrical energy, and a driven unit that is driven by the electrical energy, the control method comprising:

generating power by converting first energy into electrical energy, determining whether an operational state of the operation unit is a predetermined operational command state that shifts into a power save mode to reduce power consumption of the driven unit, shifting an operation mode into the power save mode in accordance with a result of the determining step, detecting one of a carried state in which an operator is carrying the portable electronic device and a non-carried state in which the operator is not carrying the portable electronic device, measuring time following the detecting step detecting the non-carried state, and wherein, in response to the measuring time step measuring a predetermined time, shifting the operation mode of the driven unit from a normal operation mode to the power save mode to reduce the power consumption of the driven unit when the electronic device is in a non-carried state.

42. A method for controlling a portable electronic device according to claim 41, comprising:

counting elapsed time from the start of the power save mode, and advancing the time displayed by the driven unit to the current time in accordance with a count derived in said counting step, when the power save mode is shifted to the normal operation mode.

43. A portable electronic device comprising power generating means which performs power generation by converting first energy into second energy that is electrical energy, power source means for storing electrical energy resulting from the power generation, driven means for being driven by the electrical energy supplied by the power source means, operation means on which an operator, such as a user, performs a diversity of operations, operational state determining means for determining whether an operational state of the operation means is a predetermined operational command state to shift into a power save mode for reducing a power consumption of the driven means, operation mode control means for shifting an operation mode into the power save mode in accordance with the determination result provided by the operational state determining means, power-generation detector means for detecting one of a power-generation state in which power is being generated in the portable electronic device and a non-power-generation state in which power is not being generated in the portable electronic device, timing means for measuring time following the detector means detecting the non-power-generation state, and wherein, in response to the timing means measuring a predetermined time, the operation mode control means shifts the operation mode of the driven means from a normal operation mode to the power save mode to reduce the power consumption of the driven means when the electronic device is in a non-power-generation state.

44. A portable electronic device according to claim 43, comprising elapsed time counting means for counting elapsed time from the start of the power save mode, and return to current time display means for returning the display on the time display means to the current time, which accounts for the elapsed time in accordance with the count provided by the elapsed time counting means, when the power save mode is shifted to the normal operation mode.

45. A control method for controlling a portable electronic device comprising an operation control on which an operator, such as a user, performs a diversity of operations, power source means for storing electrical energy, and driven means which is driven by the electrical energy, the control method comprising:

power generating step for generating power by converting first energy into second energy that is electrical energy, operational state determining step for determining whether an operational state of the operation control is a predetermined operational command state to shift into a power save mode for reducing a power consumption of the driven means, operation mode control step for shifting an operation mode into the power save mode in accordance with the determination result provided in the operational state determining step, power-generation state detecting step for detecting one of a power-generation state in which power is being generated in the portable electronic device and a non-power-generation state in which power is not being generated in the portable electronic device, timing step for measuring time following the power-generation state detecting step detecting the non-power-generation state, and wherein, in response to the timing step measuring a predetermined time, the operation mode control step shifts the operation mode of the driven means from a normal operation mode to the power save mode to reduce the power consumption of the driven means when the electronic device is in a non-power-generation state.

46. A control method for controlling a portable electronic device according to claim 45, comprising elapsed time counting step for counting elapsed time from the start of the power save mode, and return to current time display step for returning the display on the time display means to the current time, which accounts for the elapsed time in accordance with the count provided in the elapsed time counting step, when the power save mode is shifted to the normal operation mode.

47. A portable electronic device comprising:

a power generator that performs power generation by converting a first energy into electrical energy;

a power source that stores said electrical energy generated by said power generator;

a driven unit that is driven by the electrical energy supplied by said power source, an operation unit that performs a plurality of operations under control of a user, an operational state determining unit that determining whether an operational state of the operation unit is a predetermined operational command state that shifts into a power save mode to reduce power consumption of the driven unit, an operation mode controller that shifts an operation mode into the power save mode in accordance with the determination result of the operational state determining unit, a power-generation state detector that detects one of a power-generation state in which power is being generated in the portable electronic device and a non-power-generation state in which power is not being generated in the portable electronic device, a timer that measures time following the power-generation state detector detecting the non-power-generation state, and wherein, in response to the timer measuring a predetermined time, the operation mode controller shifts the operation mode of the driven unit from a normal operation mode to the power save mode to reduce the power consumption of the driven unit when the electronic device is in a non-power-generation state.

48. A portable electronic device according to claim 47, comprising an elapsed time counter that counts elapsed time from the start of the power save mode, and a return to current time display unit that advances the time display to the current time in response to a count from the elapsed time counter when the power save mode is shifted to a normal operation mode.

49. A method for controlling a portable electronic device including an operation control that performs a plurality of operations under control of a user, a power source that stores electrical energy, and a driven unit that is driven by the electrical energy, the control method comprising:

generating power by converting first energy into electrical energy, determining whether an operational state of the operation unit is a predetermined operational command state that shifts into a power save mode to reduce power consumption of the driven unit, shifting an operation mode into the power save mode in accordance with a result of the determining step, detecting one of a power-generation state in which power is being generated in the portable electronic device and a non-power-generation state in which the operator is not carrying the portable electronic device, measuring time following the detecting step detecting the non-power-generation state, and wherein, in response to the measuring time step measuring a predetermined time, shifting the operation mode of the driven unit from a normal operation mode to the power save mode to reduce the power consumption of the driven unit when the electronic device is in a non-power-generation state.

50. A method for controlling a portable electronic device according to claim 49, comprising:

counting elapsed time from the start of the power save mode, and advancing the time displayed by the driven unit to the current time in accordance with a count derived in said counting step, when the power save mode is shifted to the normal operation mode.

51. A portable electronic device comprising:

a power source that stores electrical energy;

a driven unit that is driven by the electrical energy supplied by said power source, an operation unit that performs a plurality of operations under control of a user, an operational state determining unit that determining whether an operational state of the operation unit is a predetermined operational command state that shifts into a power save mode to reduce power consumption of the driven unit, an operation mode controller that shifts an operation mode into the power save mode in accordance with the determination result of the operational state determining unit, a carried state detector that detects one of a carried state in which an operator is carrying the portable electronic device and a non-carried state in which the operator is not carrying the portable electronic device, a timer that measures time following the carried state detector detecting the non-carried state, and wherein, in response to the timer measuring a predetermined time, the operation mode controller shifts the operation mode of the driven unit from a normal operation mode to the power save mode to reduce the power consumption of the driven unit when the electronic device is in a non-carried state.

52. A method for controlling a portable electronic device including an operation control that performs a plurality of operations under control of a user, a power source that stores electrical energy, and a driven unit that is driven by the electrical energy, the control method comprising:

determining whether an operational state of the operation unit is a predetermined operational command state that shifts into a power save mode to reduce power consumption of the driven unit, shifting an operation mode into the power save mode in accordance with a result of the determining step, detecting one of a carried state in which an operator is carrying the portable electronic device and a non-carried state in which the operator is not carrying the portable electronic device, measuring time following the detecting step detecting the non-carried state, and wherein, in response to the measuring time step measuring a predetermined time, shifting the operation mode of the driven unit from a normal operation mode to the power save mode to reduce the power consumption of the driven unit when the electronic device is in a non-carried state.

53. A portable electronic device comprising:

a power source that stores electrical energy;

a driven unit that is driven by the electrical energy supplied by said power source, an operation unit that performs a plurality of operations under control of a user, an operational state determining unit that determining whether an operational state of the operation unit is a predetermined operational command state that shifts into a power save mode to reduce power consumption of the driven unit, and an operation mode controller that shifts an operation mode into the power save mode in accordance with the determination result of the operational state determining unit, and wherein the operation unit comprises an operation control, and further comprising a position detector that detects the position of the operation control that the user operates, and wherein the operational state determining unit is responsive to the position detector for determining that the operation unit is in an operational command state to shift into the power save mode if the operation control is moved from a first position to a second position and is then moved back to the first position from the second position within a predetermined duration of time.

54. A method for controlling a portable electronic device including an operation control that performs a plurality of operations under control of a user, a power source that stores electrical energy, and a driven unit that is driven by the electrical energy, the control method comprising:

determining whether an operational state of the operation unit is a predetermined operational command state that shifts into a power save mode to reduce power consumption of the driven unit, and shifting an operation mode into the power save mode in accordance with a result of the determining step, and wherein the determining step comprises detecting a position of the operation control, and wherein the determining step determines that the operation control is in an operational command state to shift into the power save mode if the operation control is moved from a first position to a second position and is then moved back to the first position from the second position within a predetermined duration of time.

* * * * *